US009605981B1

(12) United States Patent
Noguchi et al.

(10) Patent No.: US 9,605,981 B1
(45) Date of Patent: Mar. 28, 2017

(54) ABSOLUTE ENCODER

(71) Applicants: Mitsubishi Electric Corporation, Chiyoda-ku (JP); Mitsubishi Electric Research Laboratories, Inc., Cambridge, MA (US)

(72) Inventors: Takuya Noguchi, Chiyoda-ku (JP); Osamu Nasu, Chiyoda-ku (JP); Hajime Nakajima, Chiyoda-ku (JP); Haruhiko Takeyama, Chiyoda-ku (JP); Toru Sasaki, Chiyoda-ku (JP); Makito Seki, Chiyoda-ku (JP); Yoshinao Tatei, Chiyoda-ku (JP); Shigenori Takeda, Chiyoda-ku (JP); Takeshi Musha, Chiyoda-ku (JP); Jay E. Thornton, Cambridge, MA (US); Amit Agrawal, Cambridge, MA (US)

(73) Assignees: MITSUBISHI ELECTRIC CORPORATION, Chiyoda-ku (JP); Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 14/861,212

(22) Filed: Sep. 22, 2015

(51) Int. Cl.
*G01B 11/14* (2006.01)
*G01D 5/26* (2006.01)

(52) U.S. Cl.
CPC ..................... *G01D 5/26* (2013.01)

(58) Field of Classification Search
CPC ............ G02B 27/0093; G02B 27/2271; G02B 27/2292; G02B 2027/0138;

(Continued)

(56) References Cited

U.S. PATENT DOCUMENTS

| 5,602,544 | A | 2/1997 | Takahashi et al. |
| 6,664,535 | B1 * | 12/2003 | Nahum ............ G01D 5/34792 250/231.14 |

(Continued)

FOREIGN PATENT DOCUMENTS

| EP | 2 113 748 A2 | 11/2009 |
| JP | 2013-96757 | 5/2013 |
| JP | 5424629 | 2/2014 |

OTHER PUBLICATIONS

International Search Report issued Jul. 15, 2016 in Application No. PCT/JP2016/061644.

*Primary Examiner* — Michael P Stafira
(74) *Attorney, Agent, or Firm* — Oblon, McClelland, Maier & Neustadt, L.L.P.

(57) ABSTRACT

Provided is an absolute encoder capable of detecting the absolute angle at high resolution and with high precision. An image sensor receives light in an absolute value code pattern of a scale, an edge detecting unit detects from the received light signal an edge pixel position and an edge direction, and an edge position correcting unit corrects the edge pixel position based on the edge direction. A phase detecting unit detects from the corrected edge pixel position the phase shift amount of a shift from a reference pixel position of the image sensor, and a high precision detection unit uses a rough absolute position detected by a rough detection unit and the phase shift amount detected by the phase detecting unit to detect the absolute position with high precision.

12 Claims, 22 Drawing Sheets

(58) Field of Classification Search
CPC ............ G02B 2027/014; G02B 27/017; G02B 27/2214; G02B 3/0025; G02B 3/005; G01N 2035/0467; G01N 2035/0489; G01N 23/2204; G01N 23/225
See application file for complete search history.

(56) References Cited

U.S. PATENT DOCUMENTS

| | | |
|---|---|---|
| 8,759,747 B2 | 6/2014 | Ishizuka |
| 2013/0204574 A1* | 8/2013 | Agrawal ............ G01D 5/34792 702/150 |
| 2015/0377654 A1* | 12/2015 | Agrawal ............ G01D 5/34792 702/150 |

* cited by examiner

ABSOLUTE ENCODER

BACKGROUND OF THE INVENTION

1. Field of the Invention

The present invention relates to an absolute encoder for detecting the absolute position of a measurement subject.

2. Description of the Related Art

Absolute encoders are used in the field of machine tools, robots, and the like in order to accomplish highly precise positioning control. An absolute encoder includes, for example, a scale having a light-dark optical pattern, a light emitting element for irradiating the scale with light, a light receiving element for detecting light that has been transmitted through or reflected by the scale, and an arithmetic device disposed in the downstream of the light receiving element, and detects the absolute angle of the scale joined to a rotational axis of a motor or the like.

This type of absolute encoder generally has on the scale an absolute pattern, which is made up of angle-specific patterns for detecting a rough absolute angle, and an equally spaced incremental pattern for enhancing the resolution. Structured as this, the absolute encoder is capable of detecting the absolute angle at high resolution.

However, the improvement in resolution is making heretofore ignored errors non-negligible, and the importance of more precise detection methods is growing.

Heretofore, there have been proposed Methods as disclosed in U.S. Pat. No. 8,759,747 and Japanese Patent Application Laid-open No. 2013-96757 as methods with which high precision detection is accomplished.

In U.S. Pat. No. 8,759,747, for example, an absolute rotary encoder includes a rotating cylindrical body with a plurality of marks arranged on a cylindrical surface along the circumferential direction in fixed cycles, a light source for emitting light to the cylindrical surface, a detector for detecting the marks by way of a plurality of photoelectric conversion elements arranged at a pitch smaller than the cycle of the marks, and a calculation unit for calculating the absolute angle based on an output of the detector. The calculation unit uses correction data to correct a distortion error due to the geometric arrangement of the cylindrical surface and the detector in relation to each other.

In Japanese Patent Application Laid-open No. 2013-96757, a displacement detecting device includes a scale that has a scale pattern including incremental components, an optical system for forming an image of the scale pattern with light, a light-receiving element array for detecting the formed scale pattern image, and an arithmetic circuit for analyzing the position of the scale based on a signal of the light-receiving element array. The displacement detecting device removes distortion of the optical system by virtually rearranging the light receiving elements based on a distortion table, which is obtained from distortion information of the optical system.

However, U.S. Pat. No. 8,759,747 and Japanese Patent Application Laid-open No. 2013-96757 have the following problem:

The absolute rotary encoder of U.S. Pat. No. 8,759,747 corrects the effect of the cylindrical surface for each position of the detector, and can therefore eliminate the effect of the cylindrical surface. However, there is a problem in that, because reducing the cycle of the marks for the purpose of enhancing the resolution gives different widths to a light portion and dark portion of a mark, which is made up of a light portion and dark portion of a received optical signal, due to the light diffraction phenomenon, the precision is not improved by correction for each position of the detector alone.

In the displacement detecting device, as well as a displacement detecting method and a displacement detecting program, of Japanese Patent Application Laid-open No. 2013-96757, the distortion of the optical system is corrected for each position of the detector and deterioration in precision due to the distortion of an image forming lens can therefore be reduced. However, Japanese Patent Application Laid-open No. 2013-96757 has the same problem as U.S. Pat. No. 8,759,747 in that, because reducing the cycle of the marks for the purpose of enhancing the resolution gives different widths to a light portion and dark portion of a mark, which is made up of a light portion and dark portion, due to the light diffraction phenomenon, the precision is not improved by correction for each position of the detector alone.

SUMMARY OF THE INVENTION

The present invention has been made to solve the problem described above, and it is therefore an object of the present invention to provide an absolute encoder capable of detecting the absolute angle at high resolution and with high precision.

According to one embodiment of the present invention, there is provided an absolute encoder, including: a scale including an absolute value code pattern; a light emitting element for irradiating the scale with light; an image sensor for receiving light from the scale; an A/D converter for converting an output from the image sensor into a digital output; and an absolute position computing unit, in which: the absolute position computing unit includes: an edge detecting unit for detecting, based on a signal strength of a signal from the A/D converter and a threshold level that is set in advance, an edge pixel position of the absolute value code pattern on the image sensor, and an edge direction of the absolute value code pattern at the edge pixel position; and an edge position correcting unit for correcting the edge pixel position that is acquired by the edge detecting unit in a manner that varies depending on whether the detected edge direction is a rising edge or a falling edge; and the absolute position computing unit acquires an absolute position of the scale based on the corrected edge pixel position.

The absolute encoder according to the one embodiment of the present invention is capable of detecting the absolute position with high precision, without being affected by the diffraction of light, even when the scale is reduced in the minimum line width of the absolute value code pattern in order to enhance the resolution.

DETAILED DESCRIPTION OF THE PREFERRED EMBODIMENTS

Now, an absolute encoder according to each of embodiments of the present invention is described with reference to the drawings. Note that, in each of the embodiments, the same or corresponding portions are denoted by the same reference symbols, and the overlapping description thereof is omitted.

First Embodiment

Figure 1:
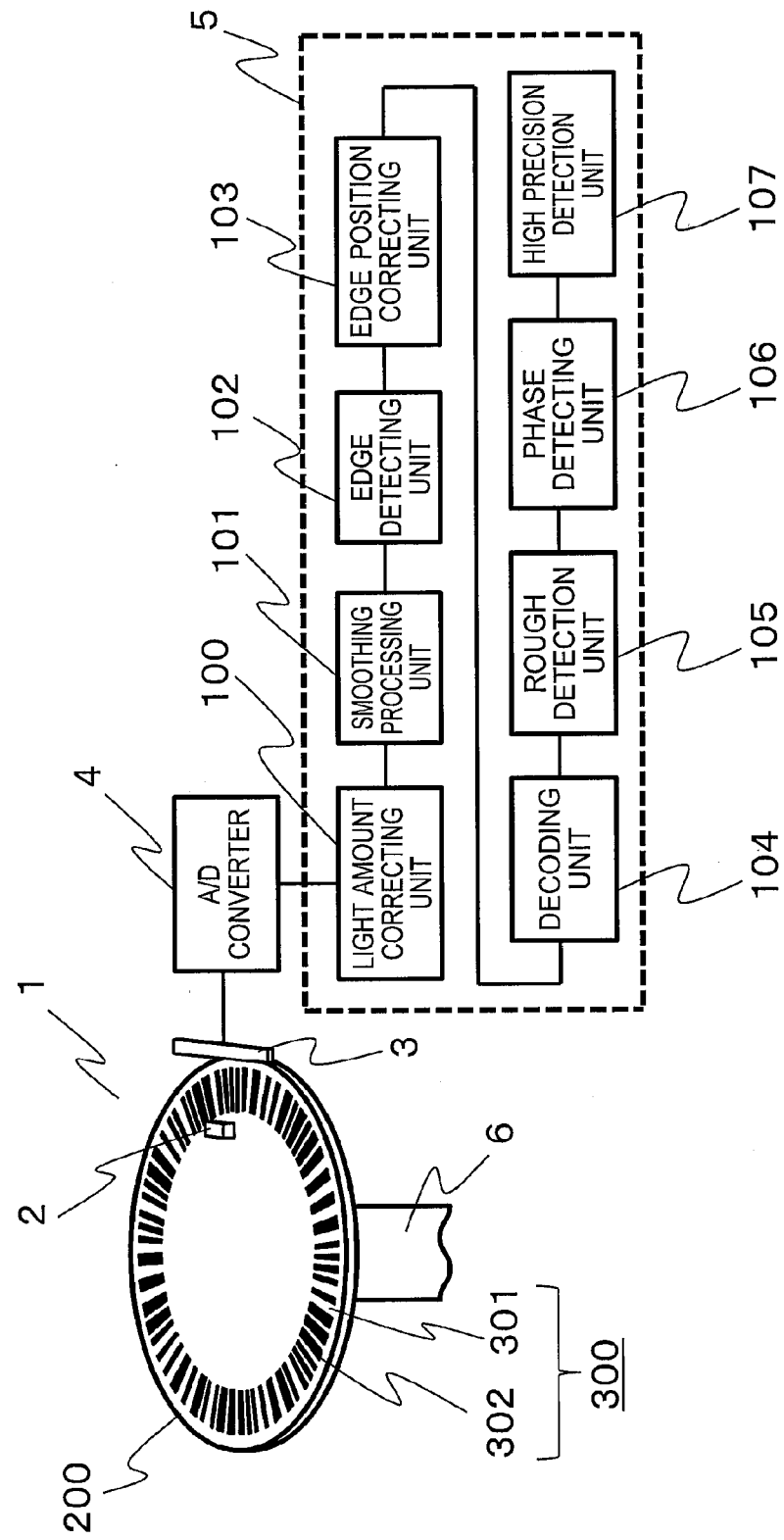
FIG. 1 is a diagram for illustrating the configuration of an absolute encoder according to a first embodiment of the present invention.

The configuration of an absolute encoder 1 according to a first embodiment of the present invention is illustrated in FIG. 1. The basic configuration of the absolute encoder 1 includes a light emitting element 2, an image sensor 3, a scale 200, an A/D converter 4, and an absolute position computing unit 5. The components of the absolute encoder 1 are described one by one below.

The light emitting element 2 is an illumination unit for irradiating the scale 200 with light. A point light source LED, for example, is used as the light emitting element 2.

The image sensor 3 is a light detecting unit for receiving light from the scale 200, and is an image pick-up device such as a CCD image sensor or a CMOS image sensor. The image sensor 3 is one-dimensional in this embodiment, but may instead be two-dimensional.

The scale 200 is joined to a rotational shaft 6 of a motor or the like, and is provided with one track, which has an absolute value code pattern 300. In the absolute value code pattern 300, a plurality of reflective portions 301 and a plurality of non-reflective portions 302 are arranged in the circumferential direction. The reflective portions 301 are portions that reflect light from the light emitting element 2. The non-reflective portions 302 are portions that absorb or transmit light from the light emitting element 2, or reflect light from the light emitting element 2 at a reflectance lower than that of the reflective portions 301. The reflective portions 301 and the non-reflective portions 302 function so as to modulate the light intensity distribution of light cast onto the image sensor 3.

The absolute value code pattern 300 includes the reflective portions 301 and the non-reflective portions 302 so that the angular position of the scale 200 is characterized, and uses, for example, a code string that is obtained by encoding pseudo-random codes such as M-series codes through Manchester encoding.

While this embodiment takes as an example a reflective encoder in which the light emitting element 2 and the image sensor 3 are both placed on one side of the scale 200, the present invention is also applicable to a transmissive encoder in which the light emitting element 2 and the image sensor 3 are placed so as to face each other across the scale 200. In the case of the transmissive encoder, the absolute value code pattern 300 includes transmissive portions and non-transmissive portions. Regardless of whether the absolute encoder 1 is reflective or transmissive, the absolute value code pattern 300 is not limited to a particular configuration as long as the absolute value code pattern 300 modifies the light intensity distribution of light cast onto the image sensor 3.

The reflective portions 301 and non-reflective portions 302 of the scale 200 are formed by, for example, depositing a metal such as chromium through vapor deposition on a glass substrate, and patterning the resultant metal film through photolithography. The scale 200 is not limited to particular materials and fabrication methods as long as the reflective portions and the non-reflective portions are formed in the case of a reflective encoder and as long as the transmissive portions and the non-transmissive portions are formed in the case of a transmissive encoder.

The A/D converter 4 is a signal converting unit for converting an analog signal from the image sensor 3 into a digital signal.

The absolute position computing unit 5 is a computing unit for computing the absolute position of the scale 200 based on an output from the A/D converter 4, and includes a light amount correcting unit 100, a smoothing processing unit 101, an edge detecting unit 102, an edge position correcting unit 103, a decoding unit 104, a rough detection unit 105, a phase detecting unit 106, and a high precision detection unit 107.

The operation of the absolute position computing unit 5 is now described.

Figure 2:
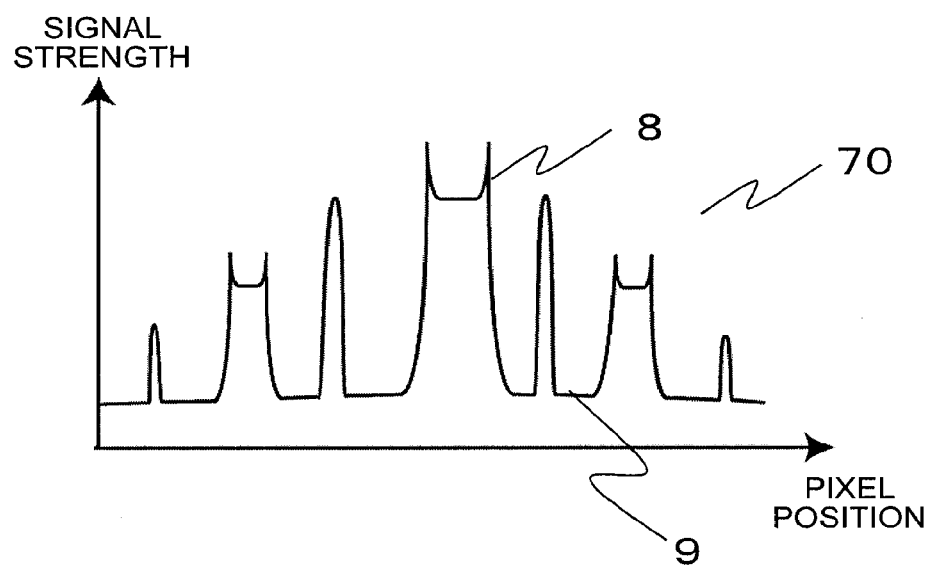
FIG. 2 is a graph for showing an example of the light amount distribution of light cast onto an image sensor of the absolute encoder according to the first embodiment of the present invention.
Figure 3:
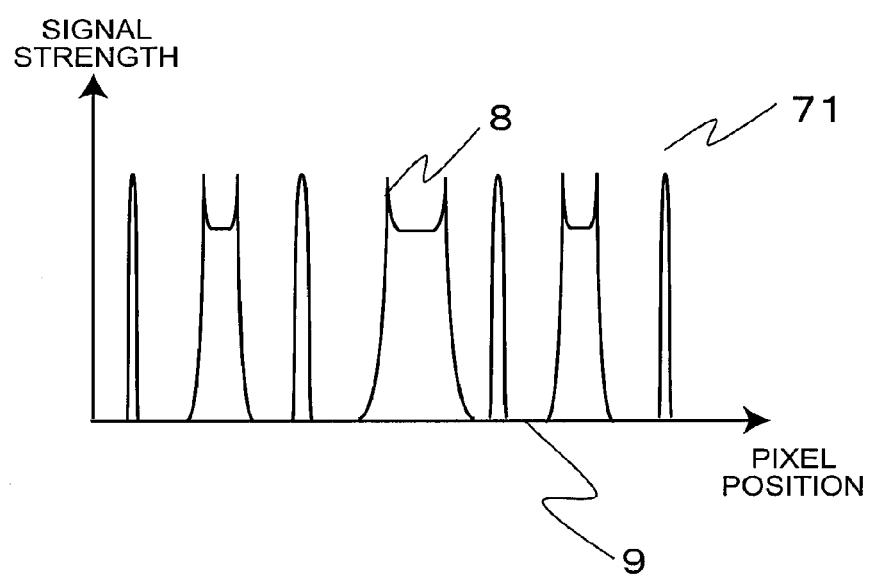
FIG. 3 is a graph for showing an example of a waveform after correction in a light amount correcting unit of the absolute encoder according to the first embodiment of the present invention.

First, an image obtained by the image sensor 3 is converted by the A/D converter 4 into digital signals, which are then input to the light amount correcting unit 100. The signals input to the light amount correcting unit 100 have, for example, a light amount distribution 70 shown in FIG. 2, where the axis of abscissa represents the pixel position and the axis of ordinate represents the signal strength. A high bit 8 in FIG. 2 indicates a pattern at the reflective portions 301 of the scale 200, and a low bit 9 indicates a pattern in the non-reflective portions 302 of the scale 200. As shown in FIG. 2, in the absolute value code pattern 300 of the scale 200, which is projected onto the image sensor 3, the light amount distribution of the high bit 8 and the low bit 9 is uneven due to the effects of the light amount distribution of the light emitting element 2 itself, gain fluctuations among pixels of the image sensor 3, and the like. The light amount correcting unit 100 therefore makes a correction for each pixel based on a light amount correction value, which is measured in advance, in order to turn the uneven light amount distribution into an even light amount distribution. A post-light amount correction light amount distribution 71 of FIG. 3, for example, is obtained as a result.

The post-light amount correction light amount distribution 71, which is the result of the correction in the light amount correction unit 100, is sent to the smoothing processing unit 101, where smoothing processing is performed on the post-light amount correction light amount distribution 71. The smoothing processing unit 101 uses, for example, a moving average filter to acquire, for example, a post-smoothing processing light amount distribution 72 shown in FIG. 4. While this embodiment takes a moving average filter as an example, processing through a Gaussian filter or the like may be executed instead, and any method that smoothes signals can be used. Light amount correction, which precedes the smoothing processing in this embodiment, may be executed after the smoothing processing. The present invention is also applicable to cases where the smoothing processing is not executed.

The post-smoothing processing light amount distribution 72 is sent to the edge detecting unit 102, which acquires an edge position on the image sensor 3 that equals a preset threshold level 10 (hereinafter referred to as edge pixel position 11).

Figure 4:
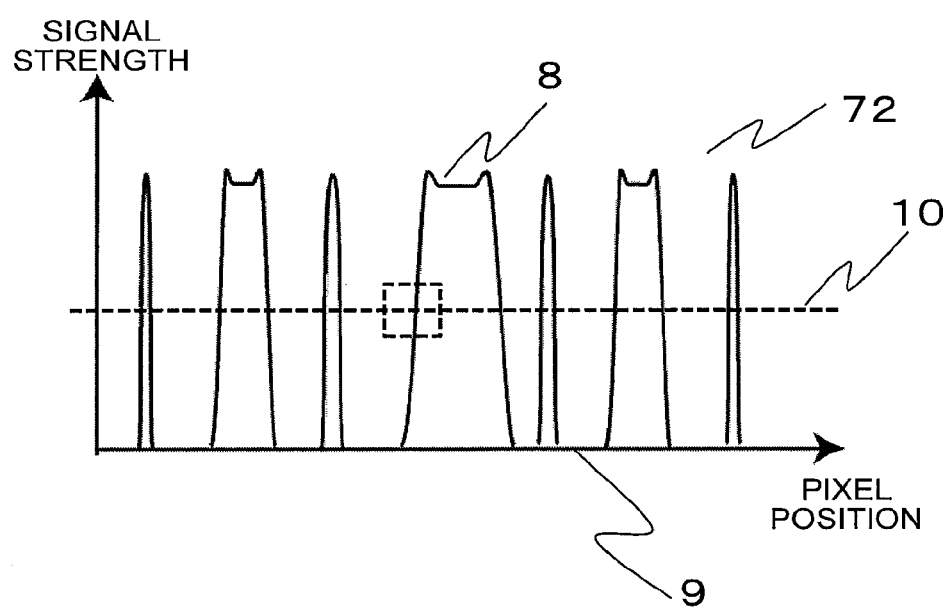
FIG. 4 is a graph for showing an example of a waveform after processing in a smoothing processing unit of the absolute encoder according to the first embodiment of the present invention.
Figure 5:
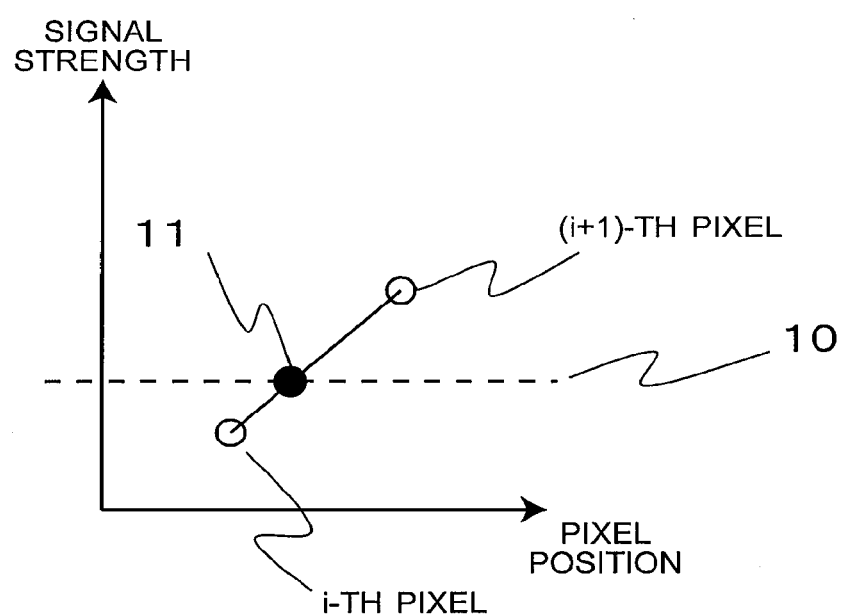
FIG. 5 is a diagram for illustrating the operation of an edge detecting unit of the absolute encoder according to the first embodiment of the present invention.

FIG. 5 is an enlarged view of the vicinity of the edge pixel position, which is enclosed by the broken line frame in FIG. 4.

The edge detecting unit 102 first determines whether or not there is an edge based on the signal strengths of an i-th pixel and an (i+1)-th pixel, which are adjacent pixels as illustrated in FIG. 5. The edge detecting unit 102 determines that there is an edge when the signal strength of the i-th pixel is lower than the threshold level 10 and the signal strength of the (i+1)-th pixel is higher than the threshold level 10, or when the signal strength of the i-th pixel is higher than the threshold level 10 and the signal strength of the (i+1)-th pixel is lower than the threshold level 10.

When it is determined that there is an edge with respect to the i-th pixel and the (i+1)-th pixel, the edge detecting unit 102 next acquires through sub-pixel processing the edge pixel position 11, which equals the threshold level 10, by performing linear interpolation on the i-th pixel and the (i+1)-th pixel, which are on either side of the threshold level 10.

While the edge pixel position 11, which equals the threshold level 10, is obtained by linear interpolation based on two pixels that are on either side of the threshold level 10 in this embodiment, two or more pixels that are on either side of the threshold level 10 may be used to obtain the edge pixel position 11. Instead of linear interpolation, a higher-order function such as a quadratic function or a cubic function may be used for interpolation.

Figure 6:
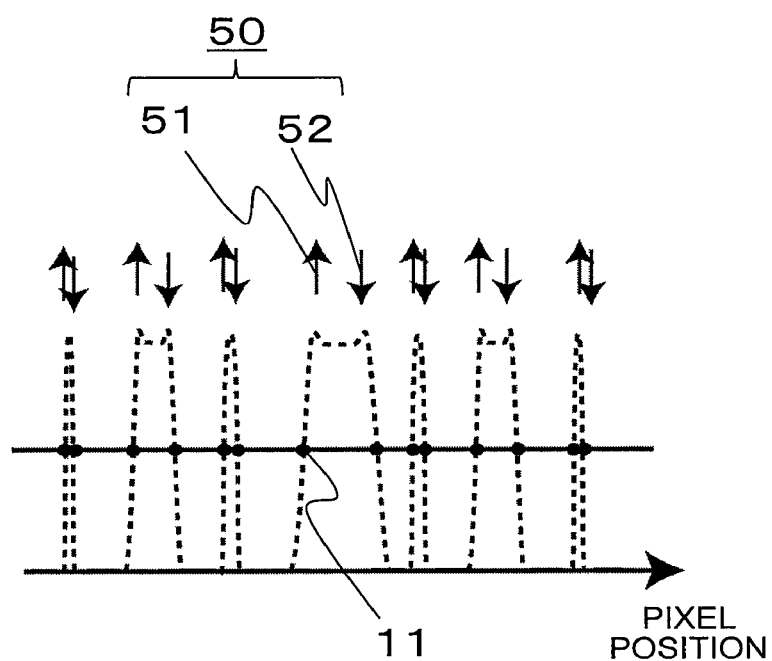
FIG. 6 is a diagram for illustrating the operation of the edge detecting unit of the absolute encoder according to the first embodiment of the present invention.

In addition to the edge pixel position 11, the edge detecting unit 102 detects an edge direction 50 of FIG. 6, for example, based on the signal strengths of the i-th pixel and the (i+1)-th pixel, which are on either side of the threshold level 10. The edge direction 50 is a rising edge 51 when the signal strength of the i-th pixel is lower than the signal strength of the (i+1)-th pixel, and is a falling edge 52 when the signal strength of the i-th pixel is greater than the signal strength of the (i+1)-th pixel.

The edge pixel position 11 and edge direction 50 detected by the edge detecting unit 102 are sent to the edge position correcting unit 103. The edge position correcting unit 103 acquires an edge correction amount from the edge pixel position 11 and edge direction 50 detected by the edge detecting unit 102, and corrects the pixel position of the edge pixel position 11 based on the edge direction 50.

How the edge pixel position 11 is corrected by the edge position correcting unit 103 is now described with reference to FIG. 7.

The following description is of a case where the high bit is narrow. Whether the high bit is narrow or wide depends on the distance between the image sensor 3 and the scale 200. In the case of a single slit, where light spreads due to diffraction, the high bit is wide. In the case of an encoder or other devices that have a plurality of slits, an image is formed by diffraction interference in which the diffraction pattern of one slit interferes with the diffraction pattern of another slit, and the high bit is therefore wide depending on the distance.

Figure 7:
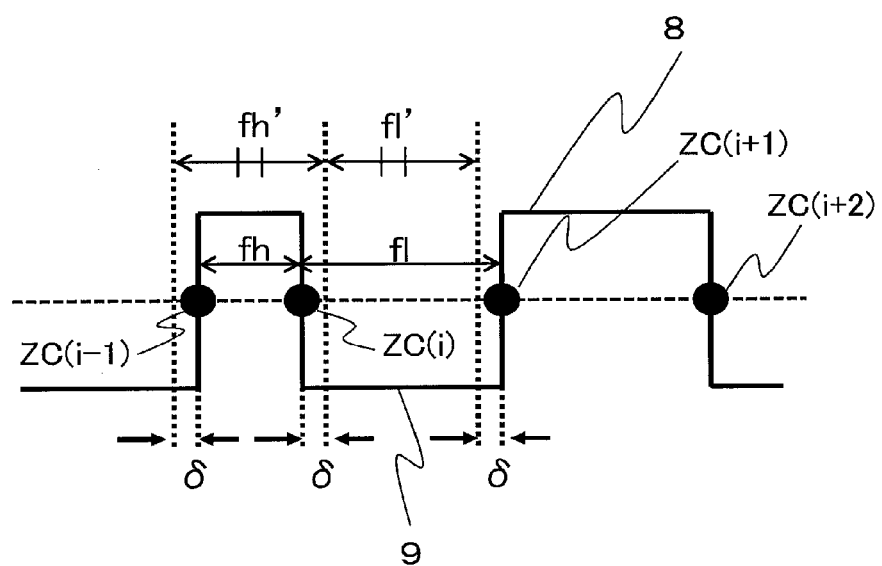
FIG. 7 is a diagram for illustrating how an edge correction amount is obtained in the absolute encoder according to the first embodiment of the present invention.

As illustrated in FIG. 7, the high bit 8 and low bit 7 of light cast onto the image sensor 3 have a basic cycle width fh and a basic cycle width fl, respectively, which are not equal to each other due to the effect of the diffraction of light. The term "basic cycle width" refers to the minimum line width of the absolute value code pattern 300, which includes the reflective portions 301 and the non-reflective portions 302.

When the (i−1)-th edge pixel position is given as ZC(i−1), the i-th edge pixel position is given as ZC(i), and the (i+1)-th edge pixel position is given as ZC(i+1), the edge correction amount of the i-th edge pixel position is acquired as follows:

The edge position correcting unit 103 first identifies a space between the rising edge 51 and the falling edge 52 as a high bit, and a space between the falling edge 52 and the rising edge 51 as a low bit. Based on the high bit 8 and the low bit 9 that are adjacent to the i-th edge pixel position, the edge position correcting unit 103 acquires a distance Lh between the edge pixel positions of the high bit 8 and a distance Ll between the edge pixel positions of the low bit 9 by Expression (1) and Expression (2).

The width of the high bit 8, namely, the distance between the edge pixel positions on either side of the high bit 8, is Lh. The width of the low bit 9, namely, the distance between the edge pixel positions on either side of the low bit 9, is Ll.

As illustrated in FIG. 7, Lh=fh and Ll=fl are satisfied when the high bit 8 and the low bit 9 have their respective basic cycle widths.

$$Lh=ZC(i)-ZC(i-1) \quad (1)$$

$$Ll=ZC(i+1)-ZC(i) \quad (2)$$

The distances Lh and Ll are each divided by an ideal basic cycle width F of the absolute value code pattern 300, and the quotient is rounded off to the closest whole number to obtain an integral multiple N (N is 1 or more) of the ideal basic cycle width F. The basic cycle width fh of the high bit 8 and the basic cycle width fl of the low bit 9 are expressed by their respective integral multiples N as follows:

$$fh=Lh/N \quad (3)$$

$$fl=Ll/N \quad (4)$$

Because N of Lh and N of Ll are obtained separately (Nh≈Lh/F: N of the high bit 8, Nl≈Ll/F: N of the low bit 9, Nh and Nl are each a number equal to or more than 1), the basic cycle widths are expressed more minutely as follows:

$$fh=Lh/Nh \quad (3a)$$

$$fl=Ll/Nl \quad (4a)$$

Each integral multiple N (Nh or Nl) indicates the number of successive bits (an integer). In other words, N indicates how many high bits are observed in succession, or how many low bits are observed in succession.

For example, when the ideal basic cycle width F of the absolute value code pattern 300 is ten pixels and the edge positions ZC(i-1), ZC(i), and ZC(i+1) in FIG. 7 are assumed as 6, 14, and 26, respectively, Lh is 8 and Ll is 12.

On the other hand, Nh and Nl, which are integers obtained by dividing Lh and Ll by F and rounding the quotients off, are expressed as Nh=Lh/F≈1 and Nl=Ll/F≈1, respectively. The basic cycle widths fh and fl are therefore 8 and 12, respectively.

When ZC(i+2) is 44 in this example, Lh=44-26=18 and Nh=Lh/F≈2, and the basic cycle width fh is therefore fh=18/2=9.

When an objective edge correction amount is given as δ, the corrected basic cycle width of the high bit 8 is given as fh', and the corrected basic cycle width of the low bit 9 is given as fl', fh' and fl' are expressed by Expression (5) and Expression (6).

$$fh'=ZC(i)-ZC(i-1)+2\delta=fh+2\delta \quad (5)$$

$$fl'=ZC(i+1)-ZC(i)-2\delta=fl-2\delta \quad (6)$$

The corrected basic cycle width fh' of the high bit 8 and the corrected basic cycle width fl' of the low bit 9 are equal to each other. From Expression (5) and Expression (6), the edge correction amount δ of the i-th edge pixel position is expressed by Expression (7).

$$\delta=(fl-fh)/4 \quad (7)$$

Figure 8:
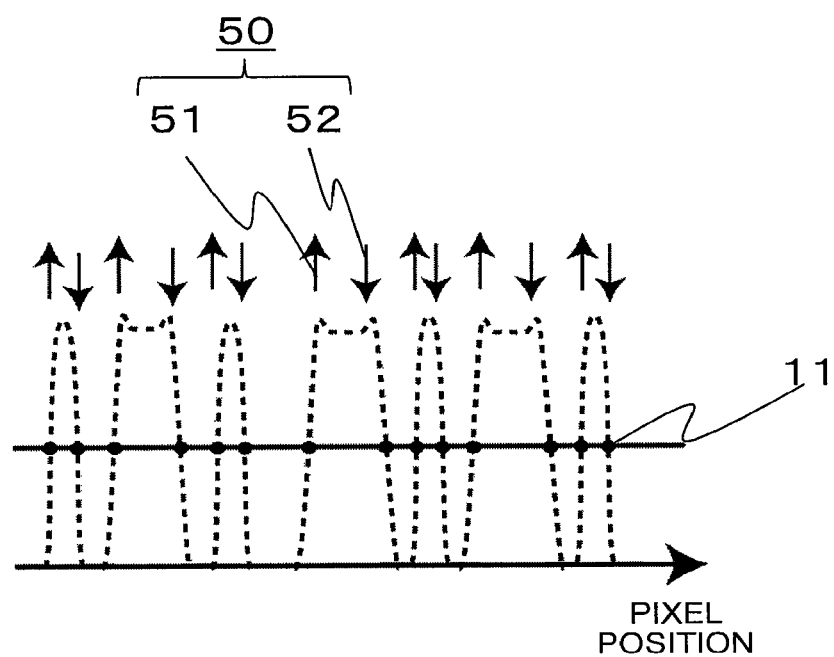
FIG. 8 is a diagram for illustrating the operation of an edge position correcting unit of the absolute encoder according to the first embodiment of the present invention.

This means that the edge correction amount δ of the i-th edge pixel position can be obtained as ¼ of a difference between the uncorrected basic cycle width fh of the high bit 8 that is adjacent to the i-th edge pixel position and the uncorrected basic cycle width fl of the low bit 9 that is adjacent to the i-th edge pixel position. Accordingly, when the edge pixel position 11 is given as x (=ZC(i)), the corrected edge pixel position 11 of the rising edge 51 is given as XR, and the corrected edge pixel position 11 of the falling edge 52 is given as XF, the edge position correcting unit 103 acquires the edge correction amount δ for each of the edge pixel positions, and makes a correction with the use of Expression (8) or Expression (9) depending on the edge direction 50, i.e., the rising edge 51 or the falling edge 52. The edge pixel position 11 after the edge position correction processing is, for example, as illustrated in FIG. 8.

$$XR=x-\delta \quad (8)$$

$$XF=x+\delta \quad (9)$$

Next, the decoding unit 104 converts the high bit 8 and the low bit 9 into a 1/0 bit string 12 based on the edge direction 50 and the edge pixel position 11. The bit string is generated so that, for example, the bit value is 1 from the rising edge 51 to the falling edge 52, and is 0 from the falling edge 52 to the rising edge 51. In short, the high bit 8 is expressed as a bit value "1" and the low bit 9 is expressed as a bit value "0". The decoding unit 104, as in the edge position correcting unit 103, calculates the integral multiples N (Nh and Hl) from the ideal basic cycle width F and the distance between edge pixel positions, and arranges, in succession, N bits each having one of the bit value "1" and the bit value "0". In this embodiment, pseudo-random codes such as M-series codes are encoded by Manchester encoding, and the bit string 12 therefore ideally includes two successive bits of the bit value "1" or the bit value "0" at maximum, for example, as illustrated in FIG. 9.

While the basic cycle widths are converted into a 1/0 bit string based on the edge direction 50 and the edge pixel position 11 in this embodiment, digitization processing may instead be used to convert the basic cycle widths into a 1/0 bit string as in the related art, and the present invention is not limited to a particular method as long as the method used is capable of converting the basic cycle widths into a 1/0 bit string.

Figure 9:
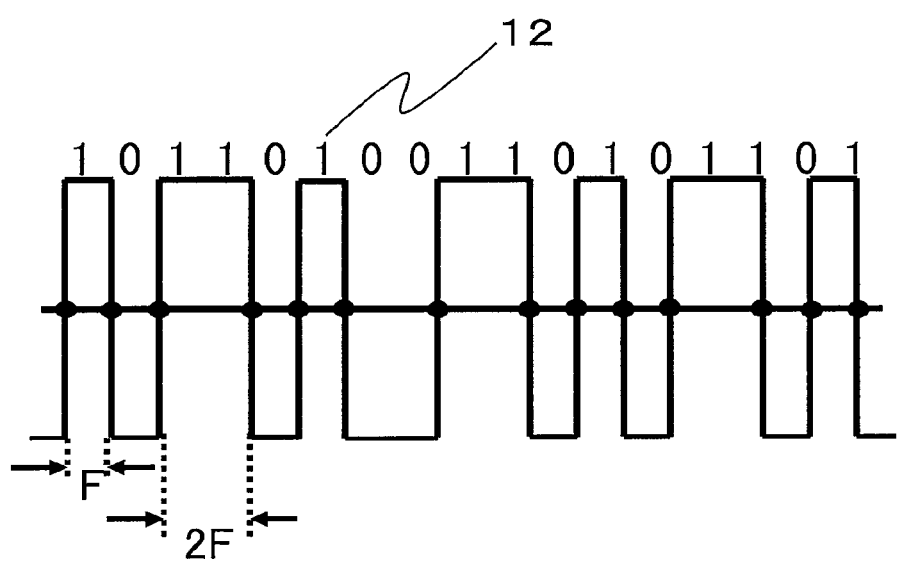
FIG. 9 is a diagram for illustrating the operation of a decoding unit of the absolute encoder according to the first embodiment of the present invention.

Next, the rough detection unit 105 detects a rough absolute position from the bit string 12 of FIG. 9 detected by the decoding unit 104. The rough detection unit 105 identifies a rough absolute position by, for example, storing in advance bit strings that form the absolute value code pattern 300 of the scale 200 in a look-up table, and comparing the bit string 12 detected by the decoding unit 104 with the bit strings in the look-up table.

Figure 10:
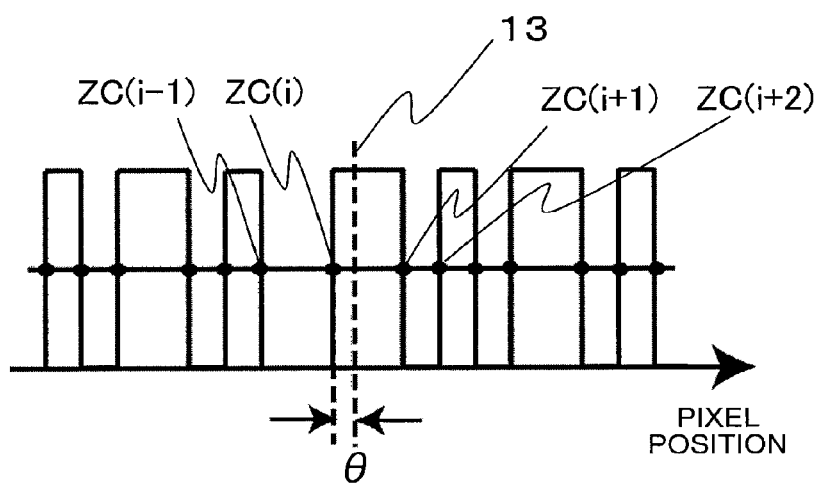
FIG. 10 is a diagram for illustrating the operation of a phase detecting unit of the absolute encoder according to the first embodiment of the present invention.

Next, the phase detecting unit 106 acquires a phase shift amount θ in relation to a reference pixel position 13 of the image sensor 3 as illustrated in FIG. 10.

How the phase detecting unit 106 acquires the phase shift amount θ is now described.

In the case where the edge detecting unit 102 detects M edges, the edge position correcting unit 103 corrects the edge pixel positions of the M detected edges, and the corrected edge pixel positions are denoted by ZC(1), ZC(2), ZC(i), . . . and ZC(M). When the center position of the reference pixel position 13 is given as P, and an edge pixel position that is closest to P is given as ZC(i), ZC(i) is expressed by Expression (10) with the use of the phase shift amount θ of a shift from the reference pixel position 13.

$$ZC(i)=P+\theta \quad (10)$$

The phase shift amount θ is a negative value when ZC(i) is to the left of the reference pixel position 13, and is a positive value when ZC(i) is to the right of the reference pixel position 13.

The phase detecting unit 106 then processes other edges than the ZC(i) that is closest to the reference pixel center position P by acquiring an integral multiple N(i) of the basic cycle F with respect to the edge pixel position ZC(i). Examples of the integer multiple N(i) are calculated as follows:

$$N(i-1)=(ZC(i-1)-ZC(i))/F$$

$$N(i+1)=(ZC(i+1)-ZC(i))/F$$

The integer multiple N(i) is calculated as N(i)=(ZC(i)−ZC(i))/F=0. In the example of FIG. 10, N(i−1)=2, N(i+1)=2, and N(i+2)=1. Using the integer multiple N of the basic cycle width F, the edge pixel positions ZC(i−1) and ZC(i+1) are expressed by Expression (11) and Expression (12).

$$ZC(i-1)=P+\theta+F\times N(i-1)+\alpha N(i-1)^2+\beta N(i-1)^3 \quad (11)$$

$$ZC(i+1)=P+\theta+F\times N(i+1)+\alpha N(i+1)^2+\beta N(i+1)^3 \quad (12)$$

Symbols $\alpha$ and $\beta$ represent a two-dimensional parameter and a three-dimensional parameter, respectively. The edge pixel positions are thus expressed by Expression (13) with the use of the integral multiples N, the reference pixel center position P, the phase shift amount $\theta$, and the high-dimensional parameters $\alpha$ and $\beta$.

$$\begin{pmatrix} 1 & N(1) & N(1)^2 & N(1)^3 \\ \vdots & \vdots & \vdots & \vdots \\ 1 & N(i-1) & N(i-1)^2 & N(i-1)^3 \\ 1 & 0 & 0 & 0 \\ 1 & N(i+1) & N(i+1)^2 & N(i+1)^3 \\ \vdots & \vdots & \vdots & \vdots \\ 1 & N(M) & N(M)^2 & N(M)^3 \end{pmatrix} \begin{pmatrix} P+\theta \\ F \\ \alpha \\ \beta \end{pmatrix} = \begin{pmatrix} ZC(1) \\ \vdots \\ ZC(i-1) \\ ZC(i) \\ ZC(i+1) \\ \vdots \\ ZC(M) \end{pmatrix} \quad (13)$$

By solving the equation of Expression (13), the phase shift amount $\theta$ can be obtained in the form of the least square method.

The reference pixel position 13 can be the center pixel, or the leftmost or rightmost pixel, of the image sensor 3, and is not particularly limited. While all edge pixel positions are used to obtain the phase shift amount $\theta$ in the form of the least square method in this embodiment, the phase shift amount $\theta$ may be obtained directly from a difference between the center position of the reference pixel position 13 and the edge pixel position ZC(i−1) that is closest to the reference pixel position 13.

Lastly, the high precision detection unit 107 adds the rough absolute position acquired by the rough detection unit 105 and the phase shift amount $\theta$ acquired by the phase detecting unit 106 to obtain the absolute position of the scale 200.

According to the configuration described above, the absolute position can be detected with high precision even when the minimum line width of the absolute value code pattern 300 is reduced for the purpose of enhancing the resolution because the absolute position computing unit 5 includes the edge detecting unit 102 and the edge position correcting unit 103, the edge detecting unit 102 detects the edge pixel position 11, which crosses the threshold level 10 set in advance, and the edge direction 50, the edge position correcting unit 103 acquires the width of the high bit 8, which represents the reflective portions 301 of the absolute value code pattern 300 projected onto the image sensor 3, and the width of the low bit 9, which represents the non-reflective portions 302 of the absolute value code pattern 300 projected onto the image sensor 3, the edge correction amount $\delta$ is calculated from the width of the high bit 8 and the width of the low bit 9, the edge pixel position 11 is corrected by the edge correction amount $\delta$ in a manner that varies depending on whether the edge direction 50 is the rising edge 51 or the falling edge 52, and the absolute position computing unit 5 uses the corrected edge pixel position to detect the absolute position of the scale 200.

The absolute position computing unit 5 further includes the decoding unit 104 for converting the high bit 8 and the low bit 9 into the 1/0 bit string 12 based on the edge direction acquired by the edge detecting unit 102 and information of the edge pixel position corrected by the edge position correcting unit 103, the rough detection unit 105 for identifying a rough absolute position from the bit string 12 acquired by the decoding unit 104, the phase detecting unit 106 for acquiring a phase shift amount in relation to the reference pixel position 13 of the image sensor 3 based on the information of the corrected edge pixel position, and the high precision detection unit 107 for acquiring a highly precise absolute position from the rough absolute position acquired by the rough detection unit 105 and information of the phase shift amount acquired by the phase detecting unit 106. The absolute position can therefore be obtained with high precision from the absolute value code pattern 300 alone. The need to provide a scale with two tracks, namely, an absolute pattern and an incremental pattern, in order to detect the absolute position as in the related art is thus eliminated, which means that the device size can be reduced and that the absolute position can be detected with high precision at high resolution.

In addition, with the edge correction amount calculated from the widths of the high bit 8 and the low bit 9 that are adjacent to the edge pixel position 11, the high bit 8 and the low bit 9 that are adjacent to the edge pixel position 11 can be made equal to each other in width despite variations in the widths of the high bit 8 and the low bit 9, which depend on the pixel position of the image sensor 3. A lens or the like for collimating light from the light emitting element 2 is thus eliminated, and the device can be made thin.

Second Embodiment

Figure 11:
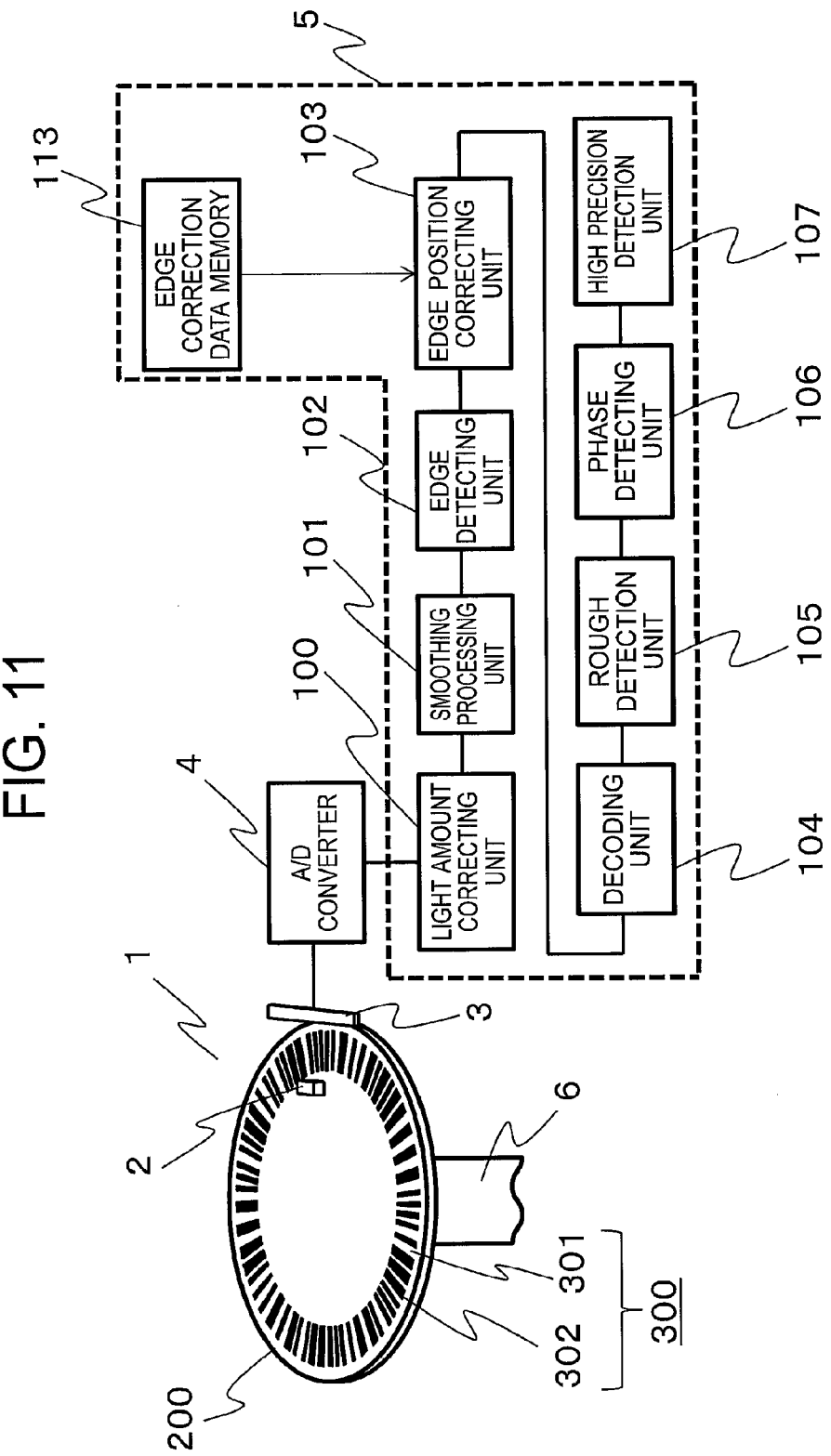
FIG. 11 is a diagram for illustrating the configuration of an absolute encoder according to a second embodiment of the present invention.

The first embodiment is configured so that the edge position correcting unit 103 acquires the edge correction amount of the edge pixel position 11. A second embodiment of the present invention describes a method in which an edge correction data memory 113 is provided as illustrated in FIG. 11, the edge correction amount is obtained as a function of the pixel position of the image sensor 3, the edge correction data memory 113 stores edge correction amount information obtained in advance, and the edge position correcting unit 103 uses the information in the edge correction data memory 113 to correct the edge pixel position 11.

An absolute encoder 1 of the second embodiment is the same in basic configuration as the absolute encoder 1 of the first embodiment, except that the edge correction data memory 113 is added and that the edge position correcting unit 103 uses a different computing method. The rest of the components are the same as those in the first embodiment, and are denoted by the same reference symbols in order to omit descriptions thereof.

Figure 12:
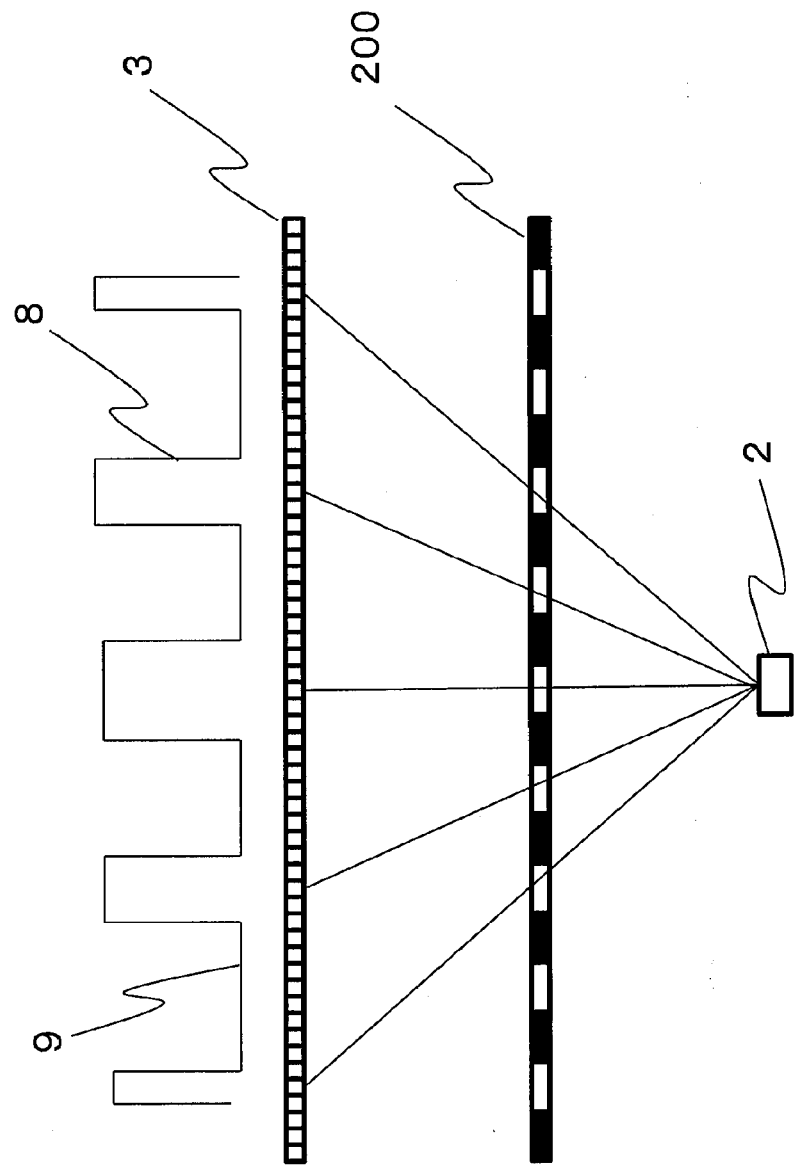
FIG. 12 is a diagram for illustrating a fact that the width of a high bit and the width of a low bit change due to the effect of diffraction.

In the case where an image forming lens or a similar component is not used, the effect of diffraction differs in the central portion and peripheral portion of the image sensor 3 because the distance from the light emitting element 2 to the image sensor 3 grows toward the peripheral portion of the image sensor 3 as illustrated in FIG. 12. Consequently, the difference between the width of the high bit 8 and the width of the low bit 9 increases toward the peripheral portion of the image sensor 3. The absolute encoder 1 of the second embodiment therefore acquires the edge correction amount as a function of the pixel position of the image sensor 3.

A description is given on a method of calculating the edge correction amount of the pixel position of the image sensor 3 from data about the basic cycle widths of the high bit 8 and the low bit 9.

Figure 13:
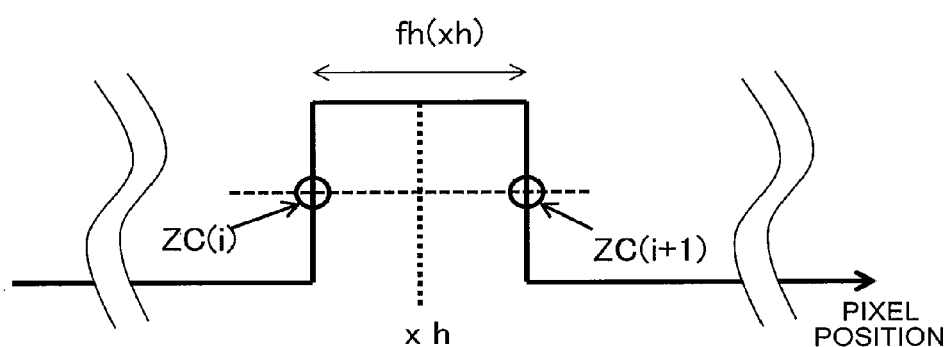
FIG. 13 is a diagram for illustrating how an edge correction amount is obtained in the absolute encoder according to the second embodiment of the present invention.

First, with the absolute encoder 1 mounted to a motor, the image sensor 3 obtains an image at an appropriate angular position, and processing up through the computation in the edge detecting unit 102 is executed to obtain the edge pixel position 11 and the edge direction 50. When the i-th edge pixel position is given as ZC(i) and the (i+1)-th edge pixel position is given as ZC(i+1) as illustrated in FIG. 13, the bit is identified as the high bit 8 if ZC(i) is the rising edge 51, and a basic cycle width fh(xh) of the high bit 8 is calculated from a center pixel xh of the high bit 8 and the distance Lh between the edge pixel positions of the high bit 8 by Expression (14), Expression (15), and Expression (16).

$$Lh = ZC(i+1) - ZC(i) \tag{14}$$

$$xh = (ZC(i+1) + ZC(i))/2 \tag{15}$$

$$fh = Lh/N \tag{16}$$

The symbol N is an integer equal to or more than 1, and represents an integral multiple of an ideal basic cycle width as in the first embodiment.

A center pixel xl of the low bit 9 and a basic cycle width fl(xl) of the low bit 9 are obtained in the same manner. In the case of the low bit 9, the bit is identified as the low bit 9 when ZC(i) is the falling edge 52.

The integral multiple N (Nh or Nl) is expressed more minutely as Nh=Lh/F or Nl=Ll/F as in the first embodiment.

Figure 14:
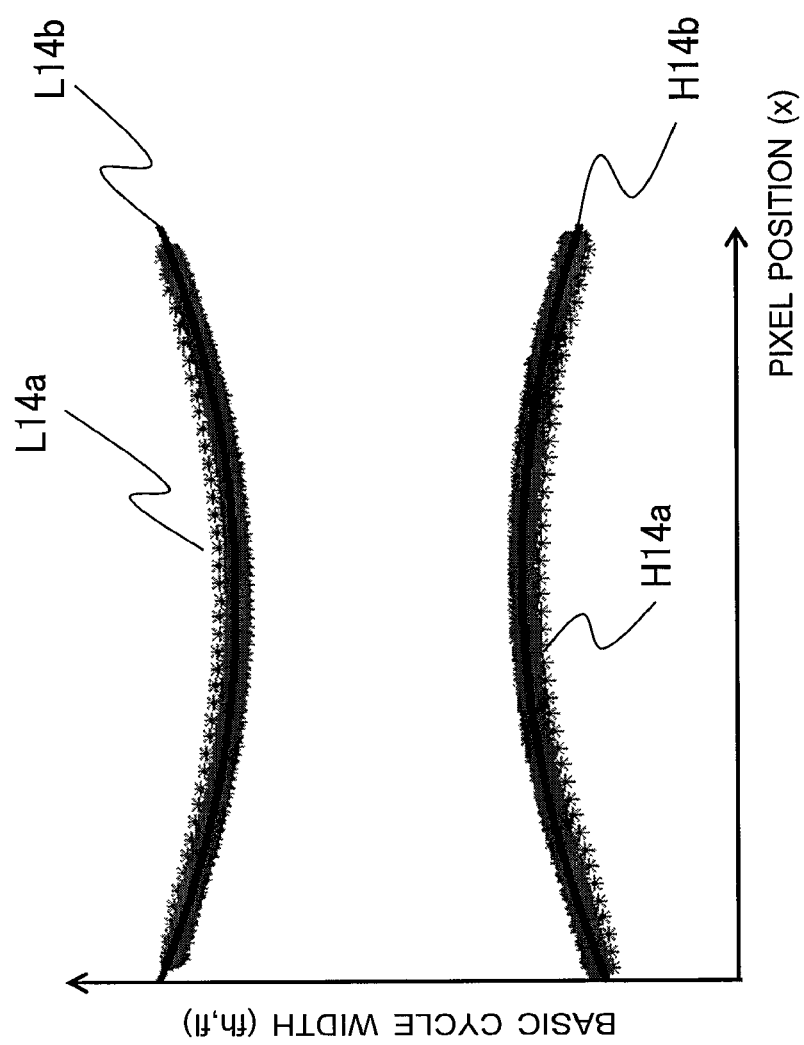
FIG. 14 is a graph for showing an example of measuring basic cycle width data of a high bit and a low bit in the absolute encoder according to the second embodiment of the present invention.

By changing the angular position of the scale 200, the bit center position data and basic cycle width data of the high bit 8 and the low bit 9 at a different pixel position can be obtained. For example, when a measurement subject is measured 1,800 times at an angle pitch of 0.2 degrees, the center pixel data and basic cycle width data of the high bit 8 and the low bit 9 are plotted as shown in FIG. 14. Measurement data of the high bit 8 is denoted by H14a, an approximate curve of the high bit 8 is denoted by H14b, measurement data of the low bit 9 is denoted by L14a, and an approximate curve of the low bit 9 is denoted by L14b. As shown in FIG. 14, the high bit 8 and the low bit 9 have different basic cycle width characteristics in relation to the pixel position, and the difference between the basic cycle width of the high bit 8 and the basic cycle width of the low bit 9 grows toward the peripheral portion of the image sensor 3.

Next, an approximate function fh(x) for the basic cycle width data of the high bit 8 in relation to the pixel position and an approximate function fl(x) for the basic cycle width data of the low bit 9 in relation to the pixel position are obtained by a quadratic least square method. The obtained quadratic functions are expressed by Expression (17) and Expression (18) when the pixel position is given as x and parameters of the functions are given as fho, αh, βh, flo, αl, and βl.

$$fh(x) = fho + \alpha h \times x + \beta h \times x^2 \tag{17}$$

$$fl(x) = flo + \alpha l \times x = \beta l \times x^2 \tag{18}$$

The edge correction amount is obtained by the same principle as in the first embodiment, namely, as ¼ of the difference between the basic cycle width of the high bit 8 and the basic cycle width of the low bit 9. An edge correction amount δ(x) of the pixel position x of the image sensor 3 is obtained by Expression (19).

$$\delta(x) = (fl(x) - fh(x))/4 = (flo - fho)/4 + \{(\alpha l - \alpha h)/4\} \times x + \{(\beta l - \beta h)/4\} \times x^2 \tag{19}$$

Correction by the edge correction amount δ(x) is made in combination with a normal test prior to the shipping of the encoder, for example, and parameters of the obtained edge correction amount function δ(x) are saved in the edge correction data memory 113.

An edge position correction method used by the edge position correcting unit 103 is described next.

After the edge detecting unit 102 calculates the edge pixel position 11 and the edge direction 50, the edge position correcting unit 103 acquires parameters of the edge correction amount δ(x) from the edge correction data memory 113. With the edge pixel position given as x, the corrected edge pixel position of the rising edge 51 given as XR(x), and the corrected edge pixel position of the falling edge 52 given as XF(x), the edge position correcting unit 103 makes a correction with the use of Expression (20) or Expression (21), depending on whether the edge direction 50 is the rising edge 51 or the falling edge 52.

$$XR(x) = x - \delta(x) \tag{20}$$

$$XF(x) = x + \delta(x) \tag{21}$$

According to the configuration described above, where the basic cycle width data of the high bit 8 and the low bit 9 in relation to the pixel position of the image sensor 3 is measured in advance, and the edge correction amount δ is obtained from the measured data as a function of the pixel position of the image sensor 3, the edge pixel position 11 can be corrected with an even higher precision.

In addition, an approximate function is analyzed with the use of the measured basic cycle width data of the high bit 8 and the low bit 9, and the edge correction amount δ is calculated from the analyzed approximate function. This prevents an error caused by a foreign object or the like at some edge pixel positions from affecting other edges much, and the absolute position can be detected with high precision despite an error factor such as a foreign object.

Further, the edge correction amount δ is calculated after the basic cycle width characteristics of the high bit 8 and the low bit 9, which vary depending on where the light emitting element 2 and the image sensor 3 are mounted in relation to the scale 200, are obtained with the light emitting element 2 and the image sensor 3 mounted. The attachment tolerance of the light emitting element 2 and the image sensor 3 can therefore be relaxed.

Moreover, with the edge correction data memory 113 provided so that the edge position correcting unit 103 corrects the edge pixel position 11 by using data in the edge correction data memory 113, the need to calculate the edge correction amount δ each time is eliminated, and the calculation load is accordingly lightened.

While a quadratic function is fitted to the basic cycle width data of the high bit 8 and the low bit 9 in the second embodiment, a fitting function of an even higher order may be used instead. Alternatively, the data may be sectioned into areas for linear interpolation, and any function that represents the basic cycle width characteristics of the high bit 8 and the low bit 9 can be employed.

Instead of saving in the edge correction data memory 113 parameters of the edge correction amount function δ(x) that are obtained in advance, the value of the edge correction amount may be saved for each pixel of the image sensor 3. The edge position correcting unit 103 in this case corrects an edge by the edge correction amount δ that is obtained by, for example, interpolating a space between pixels through linear interpolation or the like. Data saved in the edge correction data memory 113 is not particularly limited as long as the saved data is information necessary to obtain the edge correction amount δ(x) of the pixel position x.

While a measurement subject is measured 1,800 times at a pitch of 0.2 degrees to obtain the basic cycle width data of the high bit 8 and the low bit 9 in this embodiment, the present invention is applicable when data at one angular position, at least, is available.

This embodiment is configured so that information of the edge correction amount obtained as a function of the pixel position of the image sensor 3 is measured in advance and stored in the edge correction data memory 113. Instead of providing the edge correction data memory 113, as in the first embodiment, the edge position correcting unit 103 may acquire the edge correction amount as a function of the pixel position of the image sensor 3 to correct the edge pixel position 11.

Third Embodiment

Figure 15:
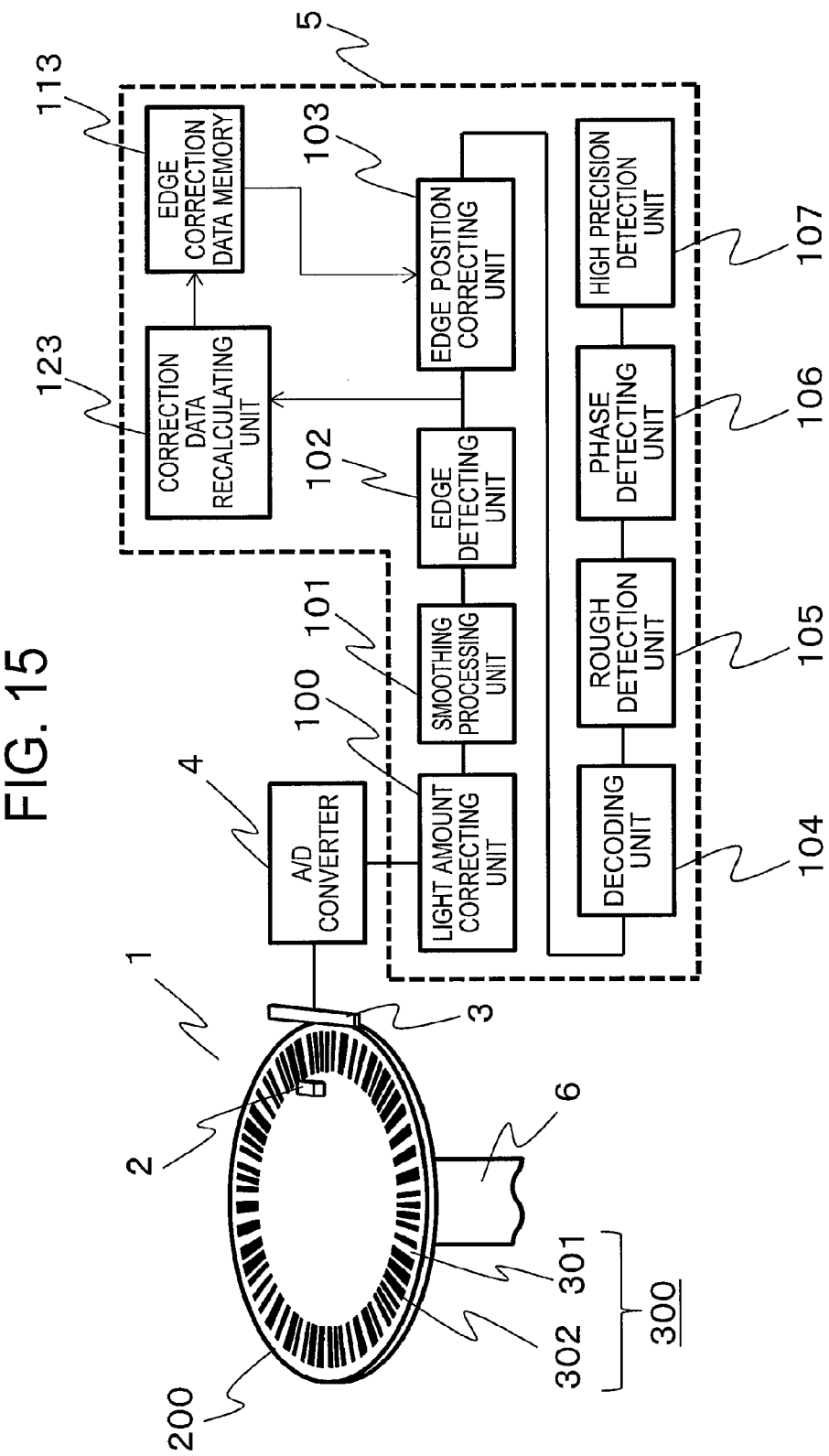
FIG. 15 is a diagram for illustrating the configuration of an absolute encoder according to a third embodiment of the present invention.

The second embodiment is configured so that the edge position correcting unit 103 corrects the edge pixel position 11 with the use of the edge correction amount information in the edge correction data memory 113 that is obtained in advance. Alternatively, data in the edge correction data memory 113 may be updated regularly by providing a correction data recalculating unit 123 as illustrated in FIG. 15.

An absolute encoder 1 of the third embodiment is the same in basic configuration as the absolute encoder 1 of the second embodiment, except that the correction data recalculating unit 123 is added. The rest of the components are the same as those in the first embodiment and the second embodiment, and are denoted by the same reference symbols in order to omit descriptions thereof.

Figure 16:
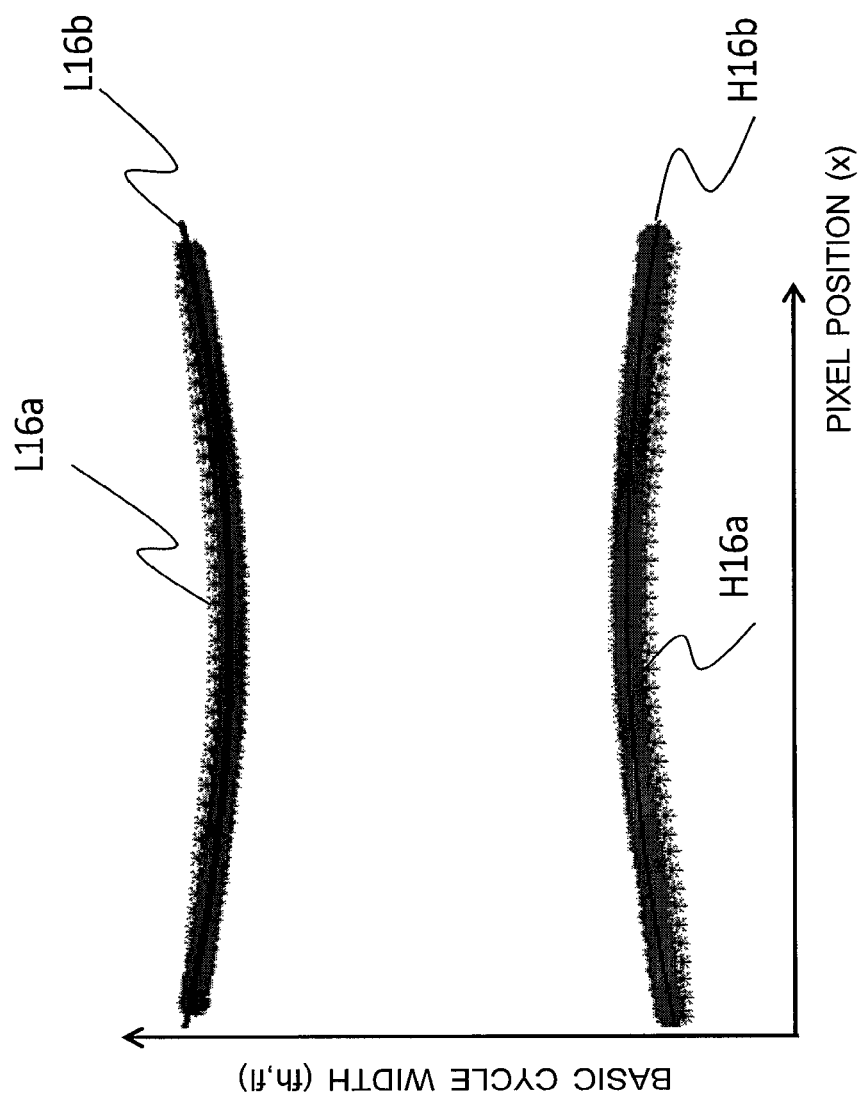
FIG. 16 is a graph for showing an example of measuring basic cycle width data of a high bit and a low bit in the absolute encoder according to the third embodiment of the present invention.

A change in ambient temperature changes the positional relation of the light emitting element 2 and the image sensor 3 to the scale 200. For example, a change in the gap from the scale 200 to the light emitting element 2 and the image sensor 3 changes the basic cycle width characteristics of the high bit 8 and the low bit 9 as well. In the case where the basic cycle width characteristics of the high bit 8 and the low bit 9 at the initial attachment position are as shown in FIG. 14, the basic cycle width characteristics of the high bit 8 and the low bit 9 that are obtained when the gap increases are as shown in FIG. 16, for example. Measurement data of the high bit 8 is denoted by H16a, an approximate curve of the high bit 8 is denoted by H16b, measurement data of the low bit 9 is denoted by L16a, and an approximate curve of the low bit 9 is denoted by L16b.

A change in basic cycle width characteristics of the high bit 8 and the low bit 9 as this leads to a drop in the precision of absolute position detection when the positions of the light emitting element 2 and the image sensor 3 in relation to the scale 200 change because the edge is corrected by the wrong edge correction amount δ(x). The third embodiment is therefore configured so that the correction data recalculating unit 123 updates the edge correction amount δ(x) obtained as a function of the pixel position of the image sensor 3.

The operation of the correction data recalculating unit 123 is now described.

Information about the edge pixel position 11 and edge direction 50 calculated by the edge detecting unit 102 is sent to the correction data recalculating unit 123 as well as to the edge position correcting unit 103. The correction data recalculating unit 123 identifies the bit as the high bit 8 when the edge direction 50 is the rising edge 51, calculates the center pixel xh and basic cycle width fh(xh) of the high bit 8 in the same manner that is used in the second embodiment to create the edge correction data, and stores the data in a memory area that is secured for the high bit 8 in the edge correction data memory 113. Similarly, the correction data recalculating unit 123 identifies the bit as the low bit 9 when the edge direction 50 is the falling edge 52, calculates the center pixel xl and basic cycle width fl(xl) of the low bit 9 in the same manner that is used in the second embodiment to create the edge correction data, and stores the data in a memory area (not shown) that is secured for the low bit 9 in the edge correction data memory 113.

The correction data recalculating unit 123 keeps collecting information about the edge pixel position 11 and the edge direction 50 until T seconds elapse since the start of the data collection, and then uses the data in the memory area secured for the high bit 8 to obtain the parameters of Expression (17) by the quadratic least square method. Similarly, the correction data recalculating unit 123 uses the data in the memory area secured for the low bit 9 to acquire the parameters of Expression (18) by the quadratic least square method. From the acquired parameters, parameters of the edge correction amount δ(x) are calculated by Expression (19) to rewrite the data in the edge correction data memory 113. The data in the memory area secured for the high bit 8 and the data in the memory area secured for the low bit 9 are cleared, and the correction data recalculating unit 123 starts collecting data again.

While the data in the edge correction data memory 113 is updated after T seconds elapse since the start of the data collection in the third embodiment, the timing of data update may be determined based on pixel position information of the image sensor 3. For example, the pixel range of the image sensor 3 is sectioned into M areas and, when the bit center pixels xh and xl enter all of the M areas, the parameters of the edge correction amount δ(x) are calculated from the data in the memory area secured for the high bit 8 and the data in the memory area secured for the low bit 9 to update the data in the edge correction data memory 113. Thus, there are various possible modes with regards to the timing of updating the data in the edge correction data memory 113. The data in the edge correction data memory 113 may of course be updated as the need arises, by calculating the parameters of the edge correction amount δ(x) in the correction data recalculating unit 123 from data of one image obtained by the image sensor 3.

According to this configuration, where the correction data recalculating unit 123 is provided to update data in the edge correction data memory 113, parts displacement that accompanies a change in temperature or other changes is prevented from decreasing precision, and high precision detection can therefore be maintained.

In addition, the reliability of the encoder can be improved by comparing information of the edge correction amount δ(x) that is calculated by the correction data recalculating unit 123 with pre-update information of the edge correction amount δ(x) that is in the edge correction data memory 113, determining that there is an encoder anomaly when a change between the pre-update information and the post-update information exceeds a range set in advance, and sounding an alarm or issuing an alert in other ways.

Fourth Embodiment

Figure 17:
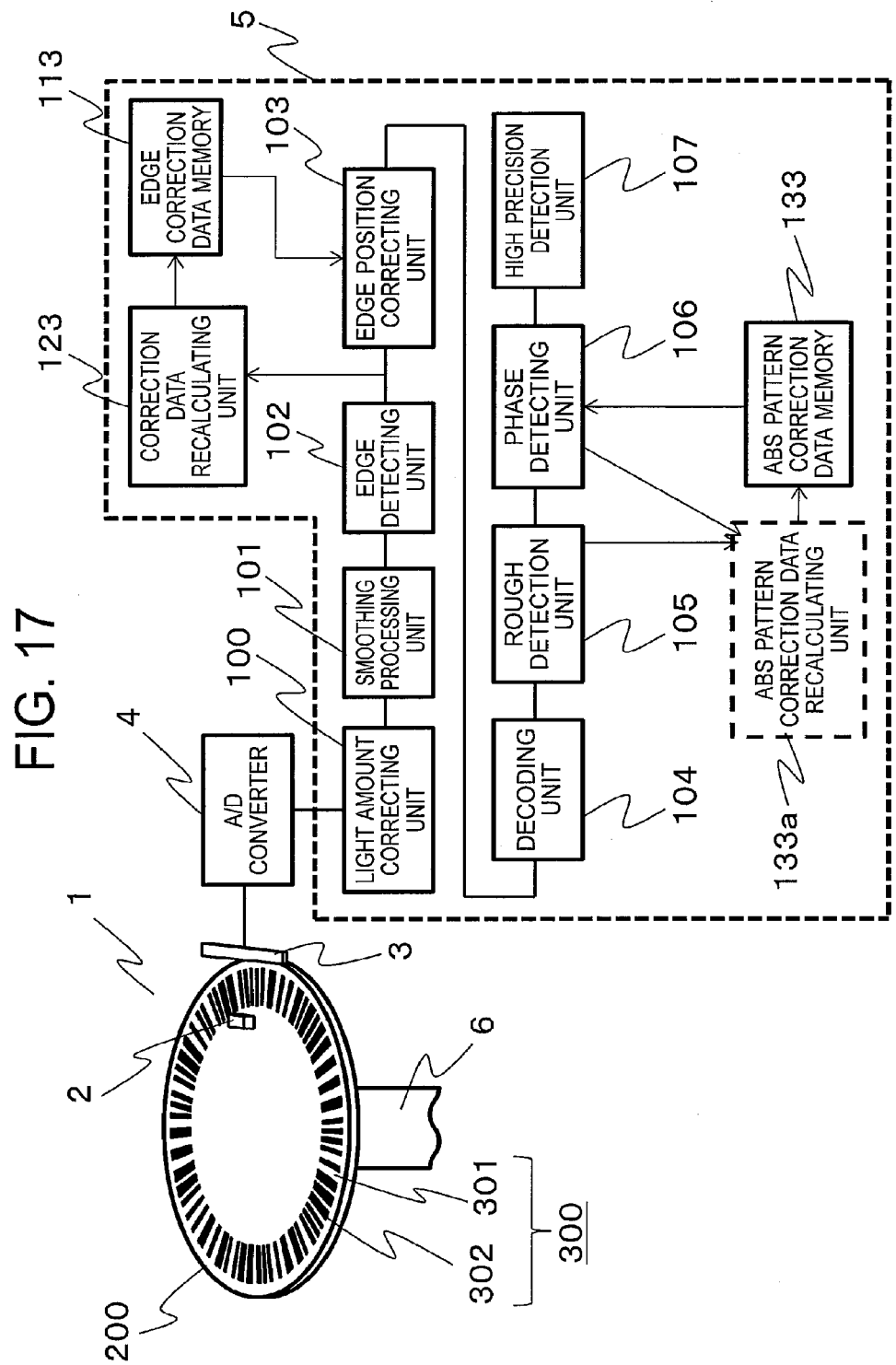
FIG. 17 is a diagram for illustrating the configuration of an absolute encoder according to a fourth embodiment of the present invention.

The first embodiment to the third embodiment are configured so that the edge position correcting unit 103 corrects the edge pixel position 11 in a manner that varies depending on the edge direction 50. Described here is a method in which an absolute (ABS) pattern correction data memory 133 is provided as illustrated in FIG. 17, the edge pixel position 11 is corrected in a manner suited to the absolute value code pattern 300, and the phase detecting unit 106 uses the corrected edge pixel position 11 to calculate the phase shift amount θ.

An absolute encoder 1 according to a fourth embodiment of the present invention is the same in basic configuration as the absolute encoder 1 of the third embodiment, except that the ABS pattern correction data memory 133 is added and that the phase detecting unit 106 executes different processing. The rest of the components are the same as those in the first embodiment to the third embodiment, and are denoted by the same reference symbols in order to omit descriptions thereof.

The code pattern 300 that is used on the scale 200 of the fourth embodiment is a pattern that is obtained by encoding pseudo-random codes such as M-series codes through Manchester encoding. Manchester encoding converts one bit into two bits so that, for example, a bit having a value "1" is turned into "1 0" whereas a bit having a value "0" is turned into "0 1". An M-series pattern that is 101110, for example, is turned into 100110101001 by Manchester encoding. In other words, in a bit string created by Manchester encoding, the number of successive "1" bits and "0" bits is two at maximum.

Figure 18:
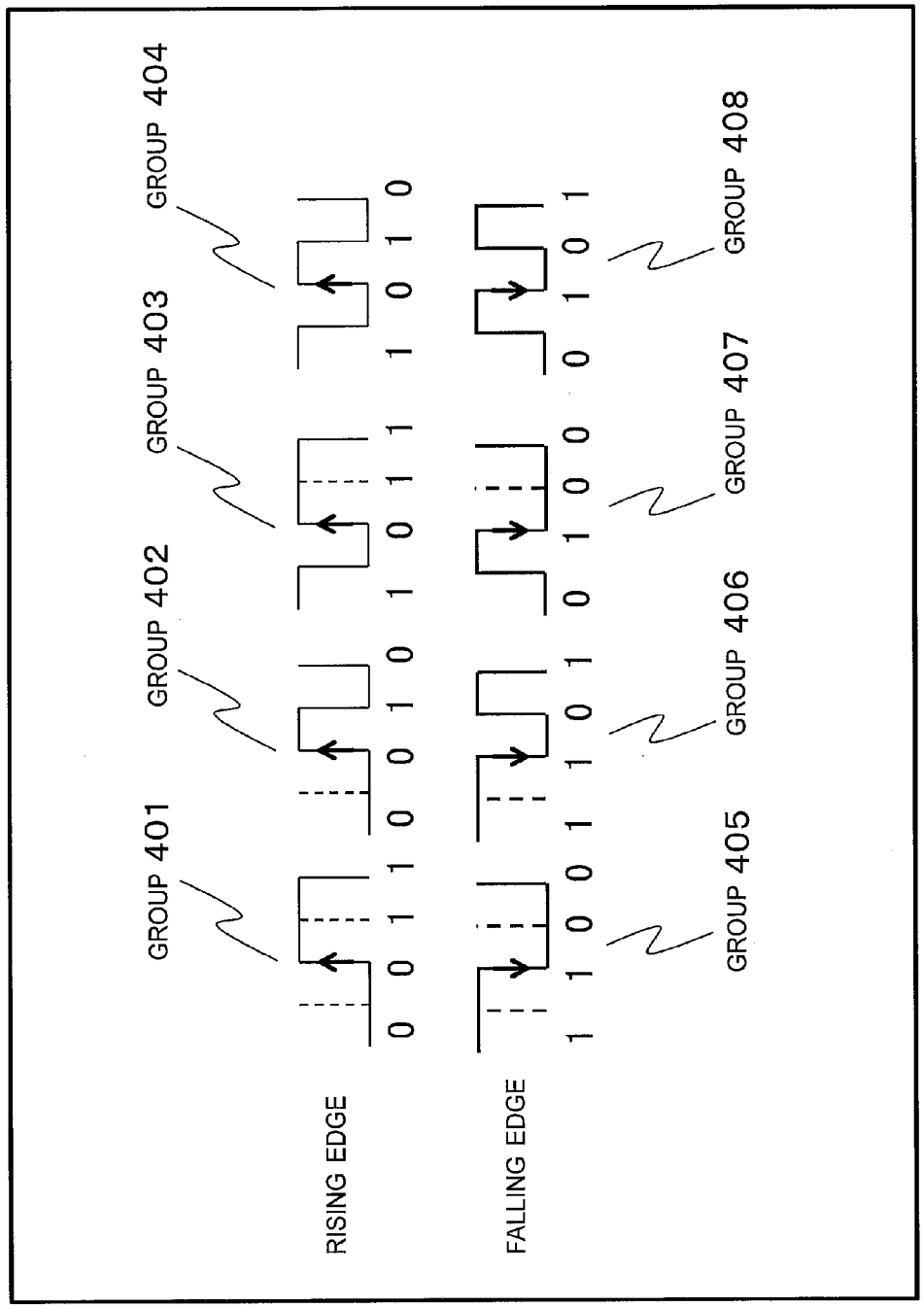
FIG. 18 is a diagram for illustrating edge groups in the absolute encoder according to the fourth embodiment of the present invention.

The bit string thus created by Manchester encoding is divided between the rising edge 51 and the falling edge 52 to be classified into eight groups, which are made up of groups 401 to 408 as illustrated in FIG. 18.

As has been described, when attention is paid on one of the reflective portions 301, light reflected by the reflective portion 301 causes the edge pixel positions 11 of the rising edge 51 and the falling edge 52 to vary because of the light diffraction phenomenon, with the result that the high bit 8 and the low bit 9 have widths different from each other. However, the edge pixel positions 11 of the rising edge 51 and the falling edge 52 are varied also by interference from another reflective portion 301. The fourth embodiment therefore involves dividing the bit string into groups of the rising edge 51 and groups of the falling edge 52, namely, eight groups in total, for correction.

A method of creating correction values of the ABS pattern correction data memory 133 is described next.

First, with the absolute encoder 1 mounted to a motor, the image sensor 3 obtains an image at an appropriate angular position, processing that precedes computation in the phase detecting unit 106 is executed, and the phase detecting unit 106 calculates the phase shift amount θ of a shift from the reference pixel position 13 of the image sensor 3 by the least square method. The phase detecting unit 106 also calculates, from the result of the fitting by the least square method, a residual error for each edge position, and saves the edge position residual error and a bit string that corresponds to the rough absolute position acquired by the rough detection unit 105 in a residual error saving memory (not shown).

Figure 19:
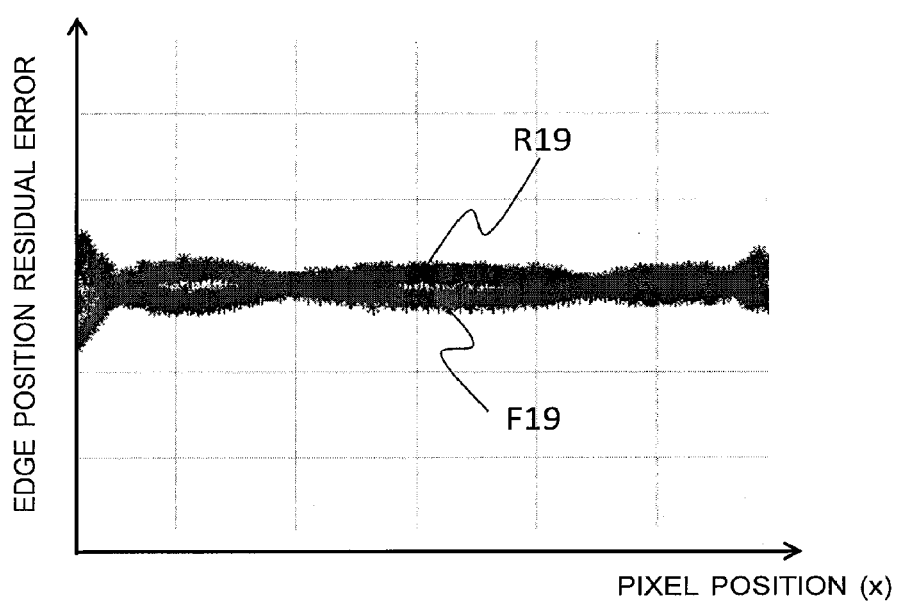
FIG. 19 is a graph for showing an example of an edge position residual error in the absolute encoder according to the fourth embodiment of the present invention.
Figure 20:
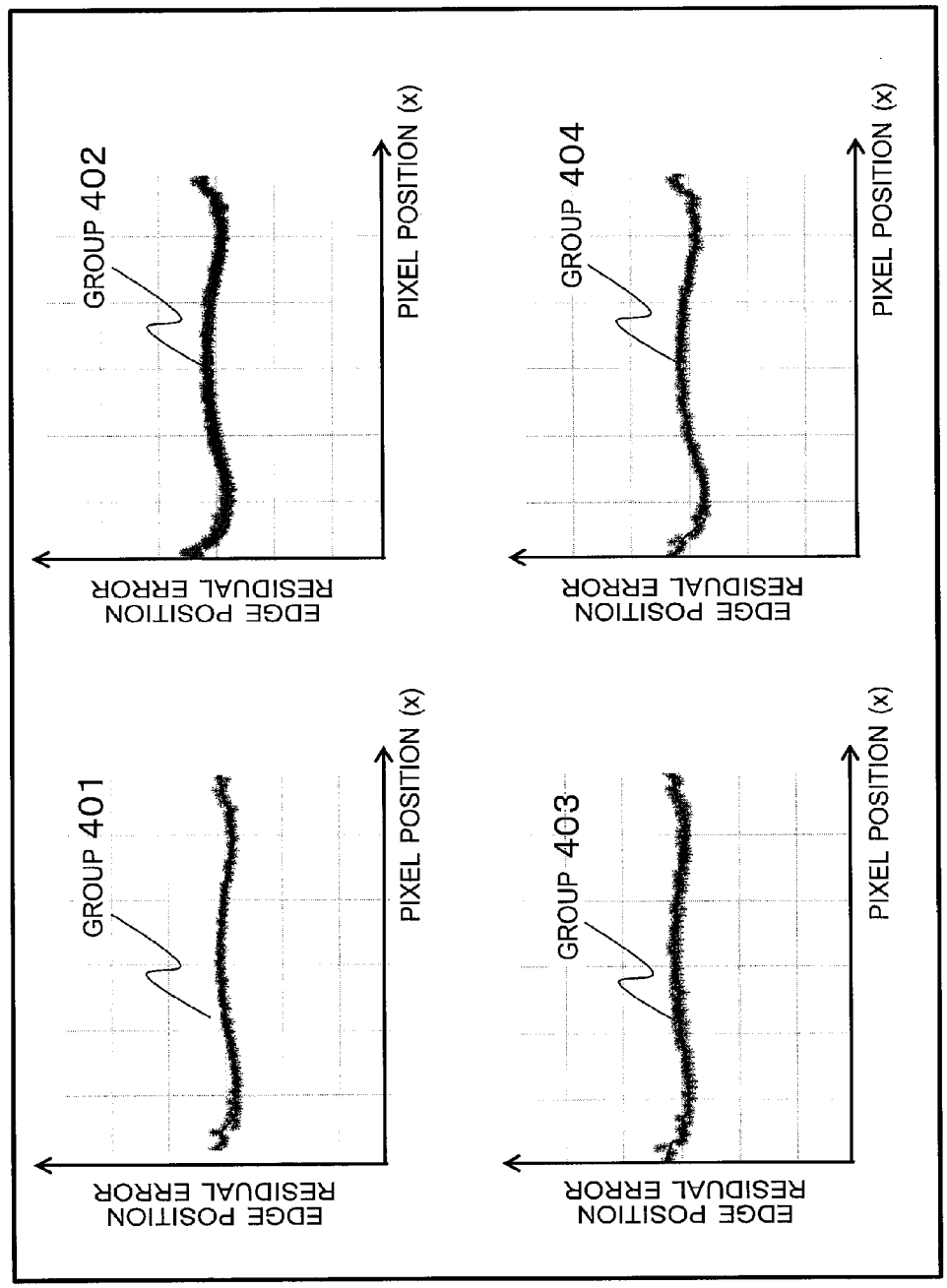
FIG. 20 is a set of graphs each for showing a correction method of the absolute encoder according to the fourth embodiment of the present invention.
Figure 21:
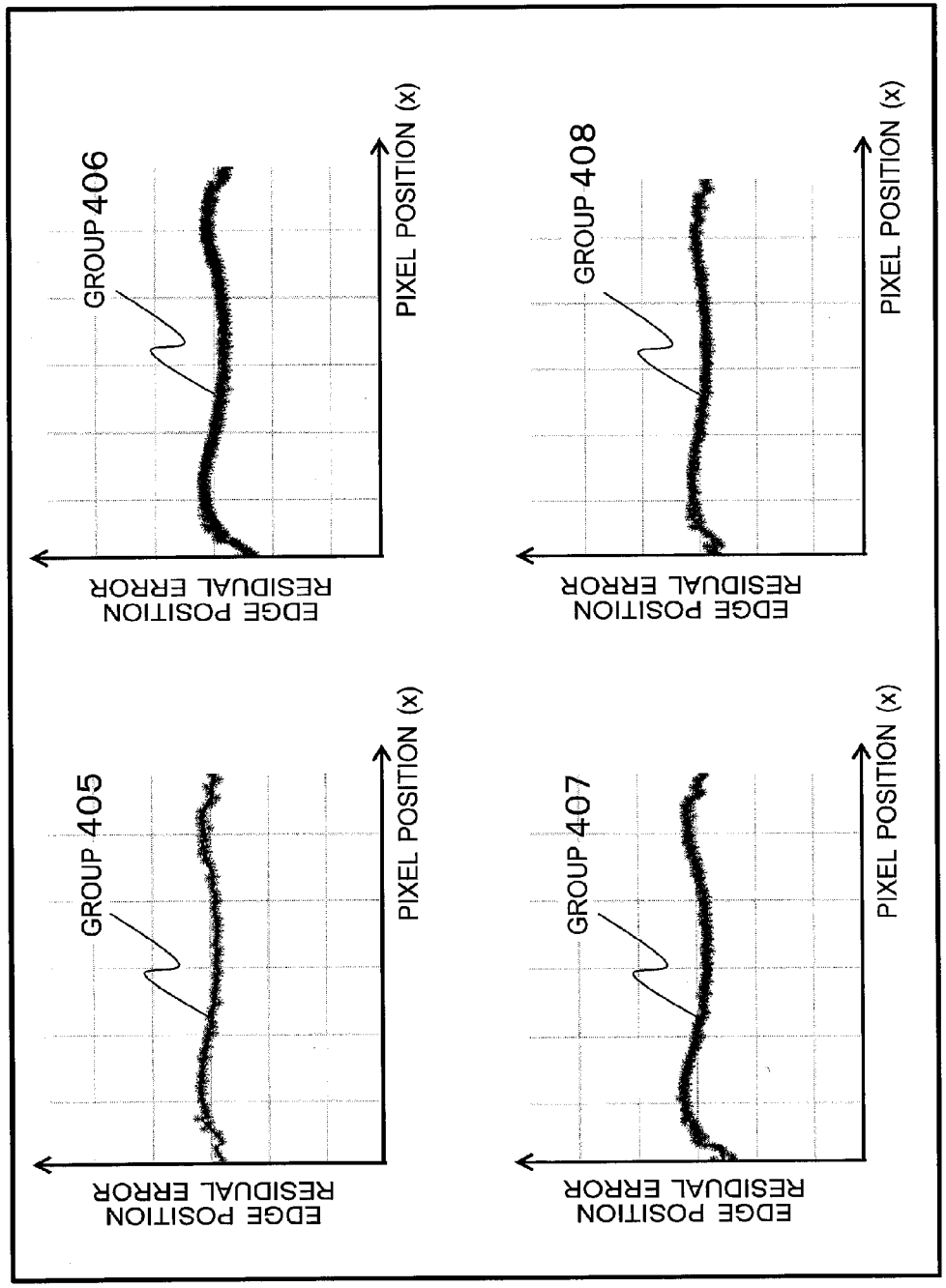
FIG. 21 is a set of graphs each for showing the correction method of the absolute encoder according to the fourth embodiment of the present invention.

The same computation is executed at a different angular position of the scale 200. For example, when a measurement subject is measured 1,800 times at an angle pitch of 0.2 degrees, edge position residual errors are plotted in relation to the pixel position as shown in FIG. 19. Denoted by R19 is the rising edge and denoted by F19 is the falling edge. Based on the bit string in the residual error saving memory, the results of the edge position residual errors in relation to the pixel position are divided into the groups of FIG. 18, namely, eight groups in total, as shown in FIG. 20 and FIG. 21. As shown in FIG. 20 and FIG. 21, characteristics of the edge position residual errors in relation to the pixel position of the image sensor 3 vary between the rising edge 51 and the falling edge 52. The residual error characteristics also slightly vary among the four groups belonging to the same edge, namely, the rising edge 51 or the falling edge 52. Data of the edge position residual errors is therefore used to analyze an approximate function for the groups of the rising edge 51 and the groups of the falling edge 52, namely, eight groups in total. For example, pixel positions are divided into sixteen areas and approximated to straight lines so as to save parameters of the straight lines of the respective areas in the ABS pattern correction data memory 133.

While pixel positions are divided into sixteen areas and approximated to straight lines in the fourth embodiment, the number of the divided areas can be smaller or larger than 16, although the precision of the correction is higher when the number of the divided areas is larger. Instead of dividing into areas, the least square method may be used to fit a higher-order function such as a quadratic function or a cubic function.

The creation and saving of the ABS pattern correction data are executed in combination with a normal test prior to the shipping of the encoder, for example.

Processing executed in the phase detecting unit 106 is described next.

An image obtained by the image sensor 3 is processed by the method described in the first embodiment to the third embodiment, up through the computation in the rough detection unit 105, and a bit string in the look-up table that corresponds to the rough absolute position is sent to the phase detecting unit 106 along with the edge pixel position 11 and the edge direction 50. The phase detecting unit 106 identifies, for each edge pixel position 11, a group to which the edge pixel position 11 belongs out of the groups of FIG. 18, based on the edge direction 50, the bit string that corresponds to the rough absolute position, and two adjacent pixels in front of and past the edge pixel position 11.

The phase detecting unit 106 next acquires from the ABS pattern correction data memory 133 correction parameters based on the identified group, and calculates an edge correction amount at the edge pixel position 11 from the obtained correction parameters. When the calculated correction amount is given as edge correction amount 67 $2(x)$, the edge pixel position 11 is corrected by adding $\delta 2(x)$ to the edge pixel position 11 in the case of the rising edge 51 and in the case of the falling edge 52 both. The phase detecting unit 106 uses the thus corrected edge pixel position 11 to acquire the phase shift amount θ, and the absolute position is calculated with high precision.

According to this configuration, where the ABS pattern correction data memory 133 is provided, a bit string is divided between the rising edge 51 and the falling edge 52 into eight groups in total, and the edge pixel position 11 is corrected by an edge correction amount obtained in advance for each group separately, an error due to the effect of diffraction is eliminated, and the absolute position can be detected with high precision.

While data in the ABS pattern correction data memory 133 is obtained in advance in the fourth embodiment, an ABS pattern correction data recalculating unit 133a, which is indicated by the broken line in FIG. 17, may be provided as in the third embodiment to update the ABS pattern correction data memory 133.

Figure 22:
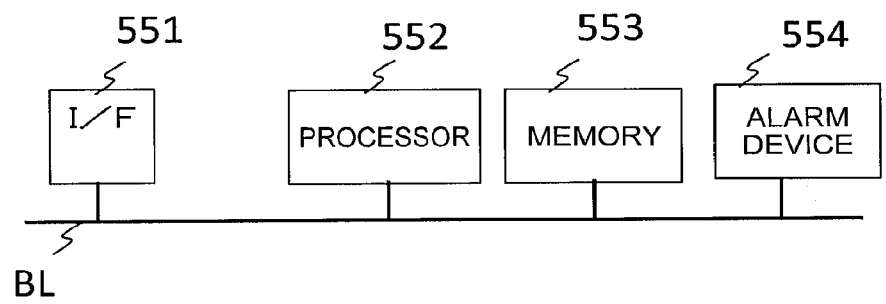
FIG. 22 is a schematic configuration diagram for illustrating an example of the hardware configuration of an absolute position computing unit of the absolute encoder according to each embodiment of the present invention.

FIG. 22 is a schematic configuration for illustrating an example of the hardware configuration of the absolute position computing unit 5 in the absolute encoder according to each embodiment of the present invention. In FIG. 22, an interface (I/F) 551, a processor 552, a memory 553, and an alarm device 554 are connected to a bus line BL by bus connection. The I/F 551 receives signals from the A/D converter 4 and others. The memory 553 stores a program of processing executed by the processor 552, and various types of data relevant to the processing. The alarm device 554 sounds an alarm or issues an alert in other ways in the event of, for example, an encoder anomaly.

The functions of the light amount correcting unit 100, the smoothing processing unit 101, the edge detecting unit 102, the edge position correcting unit 103, the decoding unit 104, the rough detection unit 105, the phase detecting unit 106, the high precision detection unit 107, the correction data recalculating unit 123, the ABS pattern correction data recalculating unit 133a, and other units in FIG. 1, FIG. 11, FIG. 15, and FIG. 17 are stored as a program in, for example, the memory 553, and are executed by the processor 552. The edge correction data memory 113 in FIG. 11, FIG. 15, and FIG. 17 and the ABS pattern correction data memory 133 in FIG. 17 correspond to the memory 553.

The memory 553 also stores, among others, the light amount correction values measured in advance and the look-up table for bit strings forming the absolute value code pattern 300, which are described in the first embodiment, and the calculated edge position residual errors and the bit string corresponding to the rough absolute position acquired by the rough detection unit 105, which are described in the fourth embodiment. The residual error saving memory is built from the memory 553.

The functions of the light amount correcting unit 100, the smoothing processing unit 101, the edge detecting unit 102, the edge position correcting unit 103, the decoding unit 104, the rough detection unit 105, the phase detecting unit 106, the high precision detection unit 107, the correction data recalculating unit 123, the ABS pattern correction data recalculating unit 133a, and other units, and generation of the data written in the memories to be used by the respective units may be configured by digital circuits that execute the respective functions, instead of the processor.

The first embodiment to fourth embodiment of the present invention can be used in combination or alone.

While the first embodiment to fourth embodiment of the present invention describe a reflective optical system, the present invention is also applicable to a transmissive optical system. The present invention is not limited to the rotary encoder for detecting the rotation angle described in the embodiments, and is also applicable to linear encoders for measuring the position on a straight line.

While the first embodiment to fourth embodiment of the present invention describe the case where only one track having the code pattern 300 is provided on the scale 200, the present invention is also applicable to encoders that have a plurality of tracks.

The present invention has been described through preferred embodiments. However, it should be understood that other alterations and changes can be made within the spirit and scope of the present invention. The appended claims are therefore intended to encompass all modifications and changes that are within the true spirit and scope of the present invention.

What is claimed is:

1. An absolute encoder, comprising:
   a scale comprising an absolute value code pattern;
   a light emitting element for irradiating the scale with light;
   an image sensor for receiving light from the scale;
   an A/D converter for converting an output from the image sensor into a digital output; and
   an absolute position computing unit,
   wherein the absolute position computing unit comprises:
      an edge detecting unit for detecting, based on a signal strength of a signal from the A/D converter and a threshold level that is set in advance, an edge pixel position of the absolute value code pattern on the image sensor, and an edge direction of the absolute value code pattern at the edge pixel position; and
      an edge position correcting unit for correcting the edge pixel position that is acquired by the edge detecting unit in a manner that varies depending on whether the detected edge direction is a rising edge or a falling edge, and
   wherein the absolute position computing unit acquires an absolute position of the scale based on the corrected edge pixel position.

2. The absolute encoder according to claim 1, wherein from the edge pixel position and the edge direction that are acquired by the edge detecting unit, a space between the rising edge and the falling edge is regarded as a high bit and a space between the falling edge and the rising edge is regarded as a low bit, and
   wherein an edge correction amount by which the edge position correcting unit corrects the edge pixel position is calculated from a difference between a width of the high bit and a width of the low bit.

3. The absolute encoder according to claim 2,
   wherein the width of the high bit and the width of the low bit each comprise a basic cycle width that corresponds to one minimum line width, which is a constituent of the absolute value code pattern on the scale, and
   wherein, when the basic cycle widths of the high bit and the low bit that are adjacent to the edge pixel position acquired by the edge detecting unit are given as fh and fl, respectively, an edge correction amount $\delta$ of the edge pixel position is calculated by an expression $\delta=(fl-fh)/4$.

4. The absolute encoder according to claim 3, wherein, when the edge pixel position acquired by the edge detecting unit is given as x, a corrected edge pixel position of the rising edge is given as XR, and a corrected edge pixel position of the falling edge is given as XF, the acquired edge pixel position x is corrected by using the correction amount $\delta$, which is calculated from a basic cycle width difference between the high bit and the low bit that are adjacent to the edge pixel position x acquired by the edge detecting unit, and by using one of an expression $XR=x-\delta$ and an expression $XF=x+\delta$, depending on whether the edge direction is the rising edge or the falling edge.

5. The absolute encoder according to claim 2,
   wherein basic cycle widths of the high bit and the low bit each of which corresponds to one minimum line width, which is a constituent of the absolute value code pattern on the scale, are calculated from the pixel position, the rising edge, and the falling edge that are acquired by the edge detecting unit, wherein pieces of basic cycle width data of the high bit and the low bit at different pixel positions of the image sensor are used to analyze an approximate function as a function of a pixel position x of the image sensor, and wherein, when an approximate function of the basic cycle width data of the high bit is given as fh(x) and an approximate function of the basic cycle width data of the low bit is given as fl(x), an edge correction amount δ(x) of the pixel position x is calculated by an expression δ(x)=(fl(x)−fh(x))/4.

6. The absolute encoder according to claim 5, wherein, when the edge pixel position acquired by the edge detecting unit is given as x, a corrected edge pixel position of the rising edge is given as XR, and a corrected edge pixel position of the falling edge is given as XF, the acquired edge pixel position x is corrected by using the correction amount δ(x), which is calculated as the function of the pixel position of the image sensor, and by using one of an expression XR(x)=x−δ(x) and an expression XF(x)=x+δ(x), depending on whether the edge direction is the rising edge or the falling edge.

7. The absolute encoder according to claim 1, wherein an edge correction amount by which the edge position correcting unit corrects the edge pixel position is acquired by the edge position correcting unit.

8. The absolute encoder according to claim 1,
wherein the absolute position computing unit comprises an edge correction data memory,
wherein the edge correction data memory stores information about an edge correction amount by which the edge position correcting unit corrects the edge pixel position and which is measured in advance, and
wherein the edge position correcting unit uses the information about the edge correction amount in the edge correction data memory to correct the edge pixel position.

9. The absolute encoder according to claim 8,
wherein the absolute position computing unit comprises the edge correction data memory and a correction data recalculating unit,
wherein the edge pixel position acquired by the edge detecting unit and information of the rising edge and the falling edge that are acquired by the edge detecting unit are sent to the correction data recalculating unit,
wherein the correction data recalculating unit analyzes basic cycle widths of the high bit and the low bit each of which corresponds to one minimum line width, which is a constituent of the absolute value code pattern on the scale,
wherein pieces of basic cycle width data of the high bit and the low bit at different pixel positions of the image sensor are used to analyze an approximate function as a function of a pixel position x of the image sensor, and
wherein an edge correction amount δ(x) of the edge pixel position x is calculated from an approximate function of the basic cycle width data of the high bit and an approximate function of the basic cycle width data of the low bit, and data in the edge correction data memory is updated with information of the calculated edge correction amount δ(x).

10. The absolute encoder according to claim 1, wherein the absolute position computing unit comprises:
a decoding unit for converting a high bit and a low bit into a 1/0 bit string, based on information of the rising edge and the falling edge that are detected by the edge detecting unit and the edge pixel position corrected by the edge position correcting unit;
a rough detection unit for detecting a rough absolute position of the scale from the 1/0 bit string detected by the decoding unit;
a phase detecting unit for detecting a phase shift amount of a shift from a reference pixel position of the image sensor, based on the edge pixel position corrected by the edge position correcting unit; and
a high precision detection unit for detecting a highly precise absolute position from the rough absolute position detected by the rough detection unit and the phase shift amount detected by the phase detecting unit.

11. The absolute encoder according to claim 10,
wherein the absolute value code pattern of the scale comprises a pattern that is created by encoding pseudo-random codes through Manchester encoding,
wherein the absolute position computing unit comprises an ABS pattern correction data memory,
wherein the phase detecting unit acquires the phase shift amount based on information of the edge pixel position corrected by the edge position correcting unit and a result of fitting by a least square method,
wherein a residual error between the result of the fitting by the least square method and the edge pixel position corrected by the edge position correcting unit is obtained,
wherein, when a minimum line width, which is a constituent of the absolute value code pattern, is one bit, for each edge pixel position, a pattern of two bits in front of and past the edge pixel position is detected based on a bit string that corresponds to the rough absolute position acquired by the rough detection unit, the obtained residual error result is divided into eight groups in total including 0011, 0010, 1011, 1010, 1100, 1101, 0100, and 0101, and the residual error result is used to analyze an approximate function for each of the eight groups separately,
wherein the ABS pattern correction data memory stores, for the each of the eight groups, information of an approximate function that is obtained in advance, and
wherein the phase detecting unit corrects the edge pixel position based on the approximate function that is stored for the each of the eight groups in the ABS pattern correction data memory, and uses the corrected edge pixel position to detect the phase shift amount of a shift from the reference pixel position of the image sensor.

12. An absolute encoder according to claim 1, wherein the scale is provided with only one track, which comprises the absolute value code pattern.

* * * * *